United States Patent
Lazarony, Jr. et al.

[19]

[11] Patent Number: 5,870,091
[45] Date of Patent: Feb. 9, 1999

[54] COMBINING PALETTES ON A COMPUTER DISPLAY

[75] Inventors: David R. Lazarony, Jr., San Jose; Jonathan K. Ferraiolo, Palo Alto; Matthew J. Foster, Mountain View; Ning-Ju Nan, Sunnyvale, all of Calif.

[73] Assignee: Adobe Systems Incorporated, San Jose, Calif.

[21] Appl. No.: 744,407

[22] Filed: Nov. 7, 1996

[51] Int. Cl.$^6$ ..................................................... G06F 3/00
[52] U.S. Cl. .................................................... 345/346
[58] Field of Search ................................... 345/340, 342, 345/346, 347

[56] References Cited

U.S. PATENT DOCUMENTS

| | | | |
|---|---|---|---|
| 5,367,623 | 11/1994 | Iwai et al. ................................ | 345/350 |
| 5,412,776 | 5/1995 | Bloomfield et al. ..................... | 345/346 |
| 5,546,528 | 8/1996 | Johnston . | |
| 5,572,649 | 11/1996 | Elliott et al. ............................. | 345/340 |
| 5,596,700 | 1/1997 | Darnell et al. ........................... | 345/340 |
| 5,644,737 | 7/1997 | Tuniman et al. ........................ | 345/352 |
| 5,644,739 | 7/1997 | Moursund ................................ | 345/354 |
| 5,694,561 | 12/1997 | Malamud et al. ....................... | 345/346 |
| 5,712,995 | 1/1998 | Cohm ...................................... | 345/342 |

OTHER PUBLICATIONS

"Corel Announces Launch of Corel Ventura 8," Business Wire, (17, Mar. 1998) pp. 0317–1299.
"Symantec Announces Version 2.5 of Visual Cafe For Tara Database Development Edition," PR Newswire, (9, Feb. 1998).
Gagnon, G., "You've Come a Long Way, BASIC!", PC Magazine, v16, n19, p.229(5), Nov. 1997.

*Primary Examiner*—A. Katbab
*Attorney, Agent, or Firm*—Fish & Richardson P.C.

[57] ABSTRACT

A computer-implemented graphical user interface method receives a select command to select a first window from a group of three or more separate and distinct windows. A dock command is received to combine the selected first window and a distinct second window from the group of windows. The first window is docked to the second window to form a single composite window having its own content and its own decoration. The composite window includes a first pane containing the first window content and a second pane containing the second window content. A collapse command is received to collapse a selected one of the first and second panes in the composite window, and an uncollapse command is received to uncollapse the previously collapsed first or second pane in the composite window. A stack command is received to stack a third window with the second pane of the composite window. The second and third window contents form a stacked group of contents, and each of the second and third window contents includes a selection indicator. A detach command is received to detach the stacked group of contents from the composite window. The stacked group of contents is displayed in a new composite window and the remaining content is displayed in the original composite window.

33 Claims, 26 Drawing Sheets

COMBINING PALETTES ON A COMPUTER DISPLAY

BACKGROUND

The invention relates to combining palettes on a computer display, such as the palettes disclosed in commonly-owned U.S. Pat. No. 5,546,528, entitled "Method of Displaying Multiple Sets of Information in the Same Area of a Computer Screen."

As computer programs become more complex, one of the biggest issues that program designers face is making all of a software program's controls easily accessible to users within a user interface. Many software products act on a document, whose content a user creates and edits. A document is typically displayed in a rectangular region of a computer display screen called a document window. A spreadsheet user arranges numbers and titles in a spreadsheet document that acts like a two-dimensional table. A word-processing user edits a document that mimics a sheet of paper. An image software user works on a document that may look like a photograph.

To allow users to create and perform actions on such documents, programmers have used a variety of user interface elements such as menus, dialog boxes and floating palettes. Pull-down menus, such as the one shown in FIG. 15, are typically lists of commands that can be hidden and activated or pulled down with a pointing or cursor control device, such as a mouse or trackball, or a keyboard command. In the example of FIG. 15, a click on command word "View" in the menu at the top of the screen will cause the pull-down menu 2 to appear. These single-word commands take up very little of the screen because the pull-down menu, in its collapsed state, has a very compact form, such as a single command word.

Dialog boxes, such as the one shown in FIG. 16, are interface elements that are typically composed of rectangular regions that appear outside of the document window. While a dialog box is active, action within the document is usually halted while the user is requested to select one or more of a number of options identified within the dialog box. The dialog box is then dismissed and disappears, and the document is updated based upon the selection which the user made from the dialog box.

Floating palettes (or simply "palettes"), unlike dialog boxes, are typically rectangular regions that "float" above or near the document window or even inside it and contain commands or tools that are used in an interactive fashion. As opposed to dialog boxes, floating palettes are "non-modal". This means that, unlike dialog boxes, actions occurring within the document are not halted while the palettes are accessed by the user. Accordingly, floating palettes are most useful for holding tools and commands that a user needs to access interactively at the same time with the document itself. In Adobe Photoshop™, for example, floating palettes are used to select colors, document layers or tools, among other things.

Some programs allow the user to switch the floating palettes from visible to invisible when specific menu commands are chosen. Other programs allow a user to selectively orient the palettes either vertically or horizontally on the computer display, as shown in FIG. 17.

SUMMARY

In general, in one aspect, the invention features a computer-implemented graphical user interface method, which includes receiving a dock command to combine a first window and a distinct second window, each window having its own content and its own decoration and being an independent user interface object. The first window is docked to the second window in response to the command to form a single composite window having its own content and its own decoration. The content of the composite window includes at least a substantial portion of the content of the first window and a substantial portion of the content of the second window.

In general, in another aspect, the invention features a computer-implemented graphical user interface method, which includes receiving a command to detach the contents of a selected plurality of docked windows from a composite window. The contents of the selected windows are displayed in a new composite window, and the remaining content of the original composite window is displayed in the original composite window.

In general, in another aspect, the invention features a computer program residing on a computer-readable medium, which includes instructions for causing the computer system to receive a dock command to combine a first window and a distinct second window, each window having its own content and its own decoration and being an independent user interface object. The first window is docked to the second window in response to the command to form a single composite window having its own content and its own decoration, the content of the composite window including at least a substantial portion of the content of the first window and a substantial portion of the content of the second window.

In general, in another aspect, the invention features a computer program residing on a computer-readable medium comprising instructions for causing the computer system to receive a command to detach the contents of a selected plurality of docked windows from a composite window. The contents of the selected windows are displayed in a new composite window and the remaining content of the original composite window is displayed in the original composite window.

Implementations of the invention may include one or more of the following features. The content of the composite window includes all of the content of the first window and all of the content of the second window. The content of each of the first and second windows includes a selection indicator and a control area, the control area having user selectable options specific to the respective window. A detach command is received to detach the content of the first window from the composite window, and the first window content is displayed in a new first window and the remaining content is displayed in the composite window, whereby two separate windows are displayed on a computer display. A second dock command is received to combine a third window with the composite window, and the third window is docked with the composite window to add at least a substantial portion of the content of the third window to the content of the composite window. A detach command is received to detach the content of a selected one of the first, second or third window from the composite window, and the content of the selected window is displayed in a new window and the remaining content of the composite window is displayed in the composite window. The first window is a user interface tool palette and the second window is a user interface tool palette. The composite window includes a first pane containing the first window content and a second pane containing the second window content. A stack command is received to stack a third window having its own content and decoration with the second pane of the composite window, wherein the second window content and the third window content form a stacked group of contents, and wherein each of the second and third window contents includes a selection indicator. The selection indicators of each of the second and third windows are displayed. A select command is received to activate one of the selection indicators, and the content of the window associated with the active selection indicator is displayed and the content of the other window is hidden. A detach command is received to detach the stacked group of contents from the composite window, and the stacked group of contents is displayed in a new composite window and the remaining content of the original composite window is displayed in the original composite window. A collapse command is received to collapse a selected one of the first and second panes in the composite window, wherein the content of each the first and second windows includes a selection indicator. The selection indicator is displayed and the remaining content of the selected first or second pane is hidden.

The various received commands can be provided to a computer in a number of different ways; for example, mouse gestures, keyboard strokes, and a graphical user interface can be used to communicate the commands to the computer system.

Among the advantages of the invention are one or more of the following. Palettes in a graphical user interface can be manipulated in a number of ways by the user to conserve screen space on a computer display. Multiple palettes can be combined in a docked manner such that a essential portion of the information of each of the palettes are displayed and duplicative information hidden. Further, palettes can be combined in a stacked (or tabbed) manner, in which the active control area of only one palette is shown and selection indicators of the other palettes are displayed to allow the user to selectively activate the hidden palettes. Palettes can also be combined using both the docking and stacking techniques to provide further flexibility to the user. Once combined, the palettes can be collapsed to further conserve screen space. In addition, the group can be manipulated (e.g., moved, resized, or closed) as if the group was one palette.

Other features and advantages of the invention will become apparent from the following description and from the claims.

DETAILED DESCRIPTION

A software program according to the invention allows palettes in a graphical user interface to be manipulated in a number of ways by the user to conserve screen space on a computer display. First, multiple palettes can be docked to each other to form a combined or composite palette, in which the palettes are arranged vertically. The combined palette allows the user to manipulate (e.g., move, resize, zoom, and collapse) the group of palettes as if they were one palette. Further, palettes can be combined in a stacked (or tabbed) manner, in which the active control area of only one palette is shown and the control tabs of the other palettes are displayed to allow the user to selectively activate the hidden palettes. Palettes can also be combined using both the docking and stacking techniques to provide further flexibility to the user. Once combined, the palettes can be collapsed to further conserve screen space.

Figure 1A:
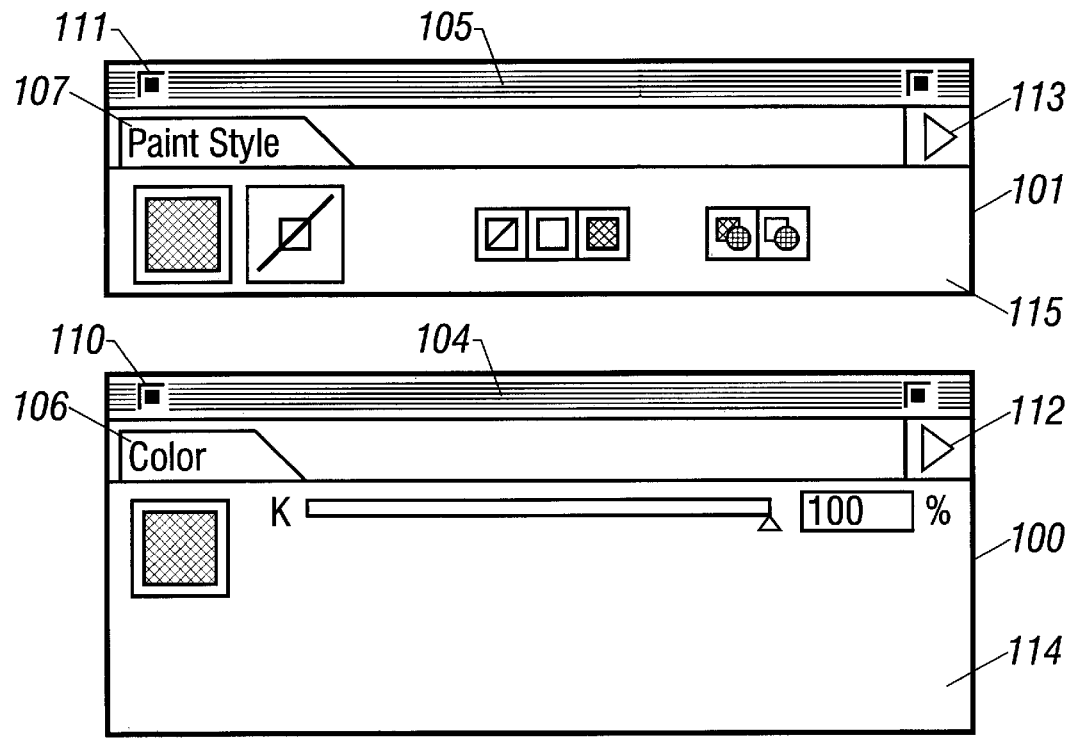
FIGS. 1A and 1B illustrate the docking of two palettes to form a combined palette.

Referring to FIG. 1A, two palettes 100 and 101 are displayed in a computer program graphical user interface. The "Paint Style" and "Color" palettes 101 and 100, respectively, are examples of two different control palettes used in the program. Each palette 100, 101 includes its own content and decoration. The decoration includes a title bar 104, 105. A "Close" control button 110, 111 is selectable by a user with a cursor to close the palette. A hidden palette may be re-activated by choosing an appropriate menu command. The floating "Color" and "Paint Style" palettes 100 and 101 also can be moved anywhere on the computer screen, and they can be overlapped.

The content of each of the palettes 100 and 101 include "Color" and "Paint Style" control tabs 106 and 107, respectively, as well as control areas 114 and 115. The control area 114, 115 of each palette 100, 101 includes various buttons and user options selectable by the user to perform different functions. The content of each palette 100, 101 also has a palette menu button 112, 113 selectable by the user to bring up more palette-related user options.

To dock the "Color" palette 100 to the "Paint Style" palette 101, the user moves the "Color" palette 100 by selecting the "Color" control tab 106 with the cursor and dragging the palette 100 to the "dock area" of "Paint Style" palette 101. The dock area is defined as any region of a palette outside the control tab region. Alternatively, the dock area can be defined as any other portion of the palette.

Figure 1B:
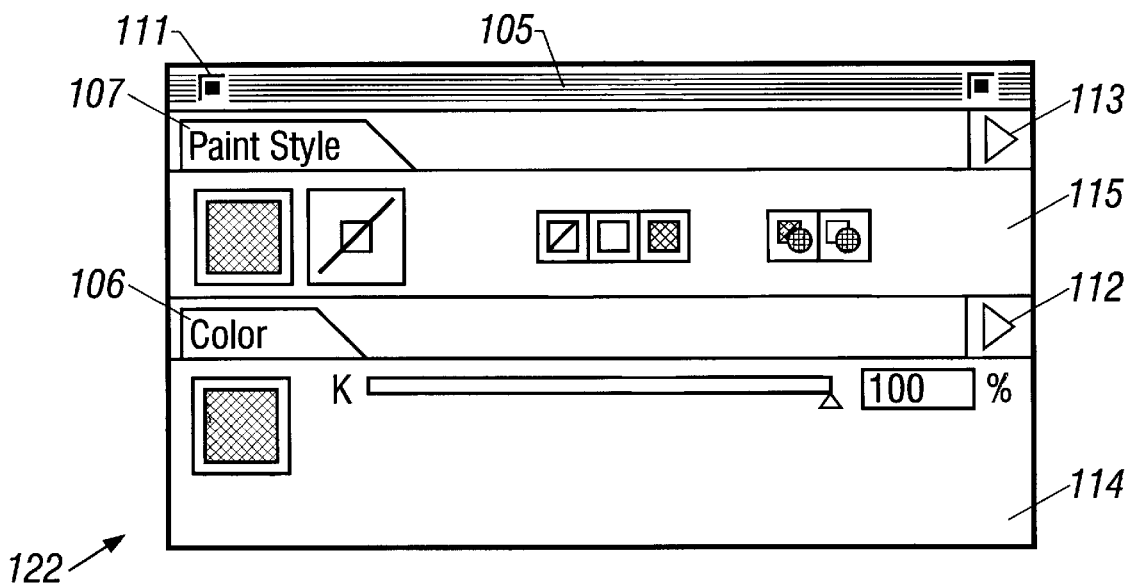

Once the "Color" control tab 106 is dragged to the dock area of the "Paint Style" palette 101 and the user releases the mouse button, the program responds by docking the palette 100 to the bottom of the palette 101, as shown in FIG. 1B.

Referring to FIG. 1B, once the "Color" palette 100 is docked to the "Paint Style" palette 101, the title bar 104 of the "Color" palette 100 is hidden. However, other portions of the palette 100 remain visible, including the "Color"

control tab 106, the palette menu button 112, and control area 114 (which constitute the content of the palette 100). The resulting palette created by docking one palette to another appears as one larger combined or composite palette window 122 having two panes containing the control areas 114 and 115 and associated with control tabs 106 and 107, respectively. The user can move or resize the entire palette window 122 (including the palettes 100 and 101). Further, the entire combined palette 122 can be closed by selecting the "Close" control button 111. Once the combined palette 122 is hidden, the user can reactivate the combined palette 122 by choosing either the "Color" palette or "Paint Style" palette from a menu in the graphical user interface.

In effect, once two palettes are docked, the combined or composite window appears to have its own content and decoration. The content of the composite window 122 includes the two panes of the palettes 100 and 101, and the decoration includes the title bar 105.

Figure 2A:
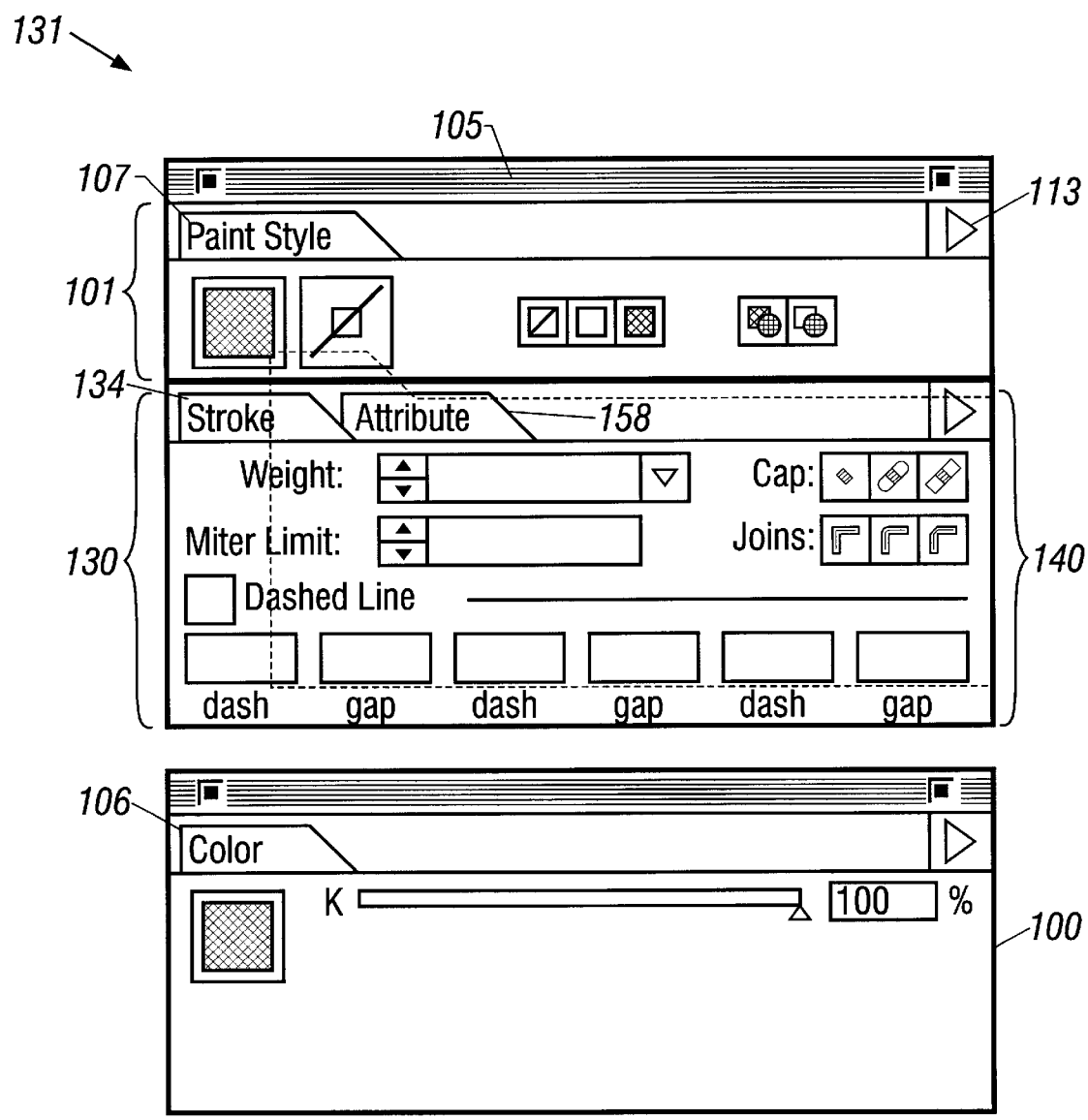
FIGS. 2A and 2B illustrate the docking of a palette between two other docked palettes.
Figure 2B:
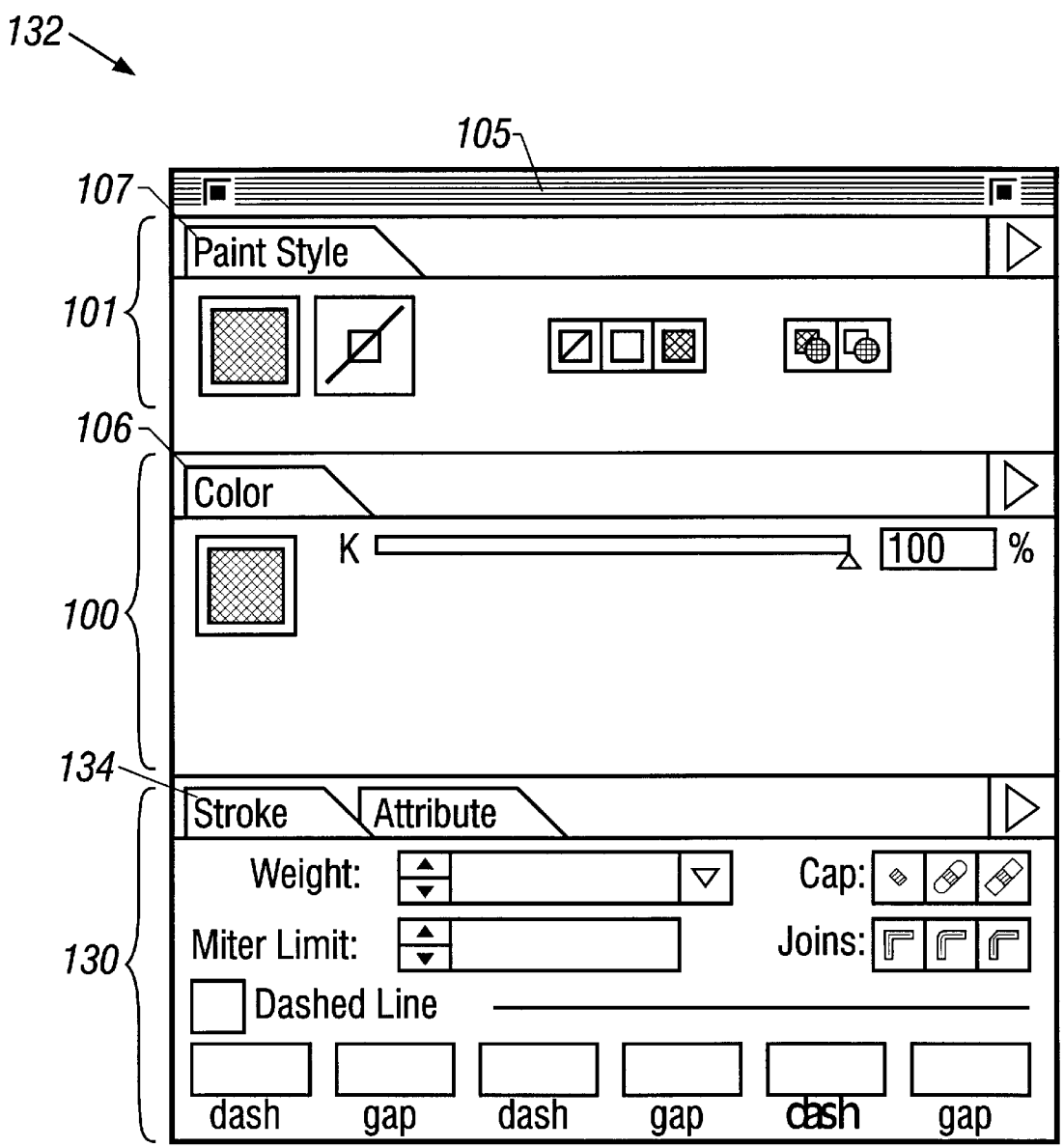

Referring to FIGS. 2A and 2B, the user can also dock one palette between two other palettes. In FIG. 2A, the "Paint Style" palette 101 is initially docked with a "Stroke" palette 130 in a combined palette 131. By dragging the "Color" control tab 106 with the cursor to the docking area of the "Paint Style" palette 101, the "Color" palette 100 is docked between the "Paint Style" palette 101 and the "Stroke" palette 130 to create a combined palette 132, which includes three rows of control tabs 107, 106, and 134, as shown in FIG. 2B.

Once combined, any one of the palettes in the combined palette 132 can be resized vertically. The "Color" palette 100 includes a resize control button 133 which is selected and dragged by the user to resize the palette 100 vertically. If the palette 100 is resized, then the "Stroke" palette below it must be repositioned (i.e., moved down by the amount of the resize operation). When palettes are docked, resizing of each palette in the horizontal direction is restricted, with movement allowed only vertically. Once a palette is undocked, the horizontal resizing restriction is removed.

Figure 3A:
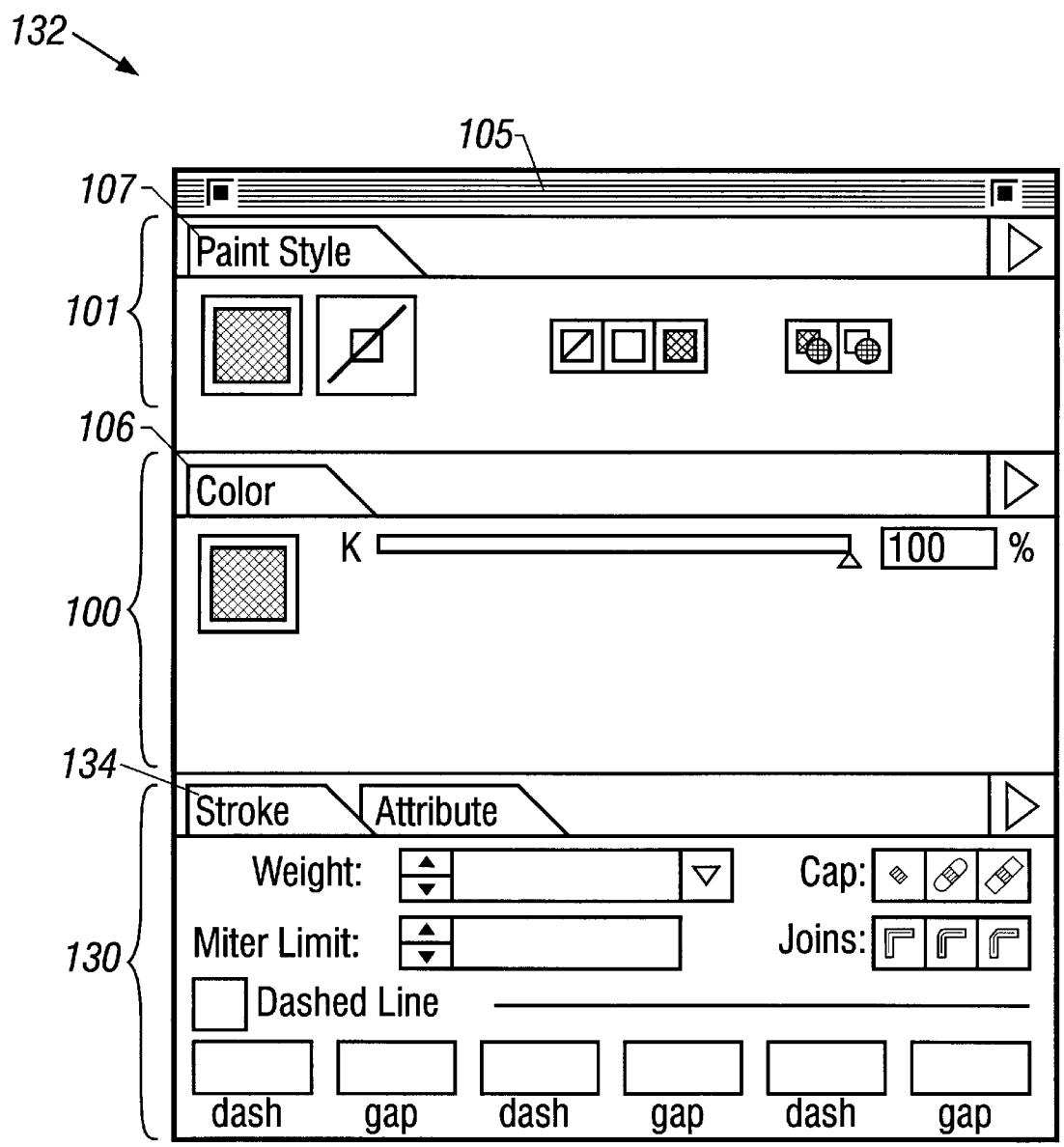
FIGS. 3A and 3B illustrate the undocking of three docked palettes.
Figure 3B:
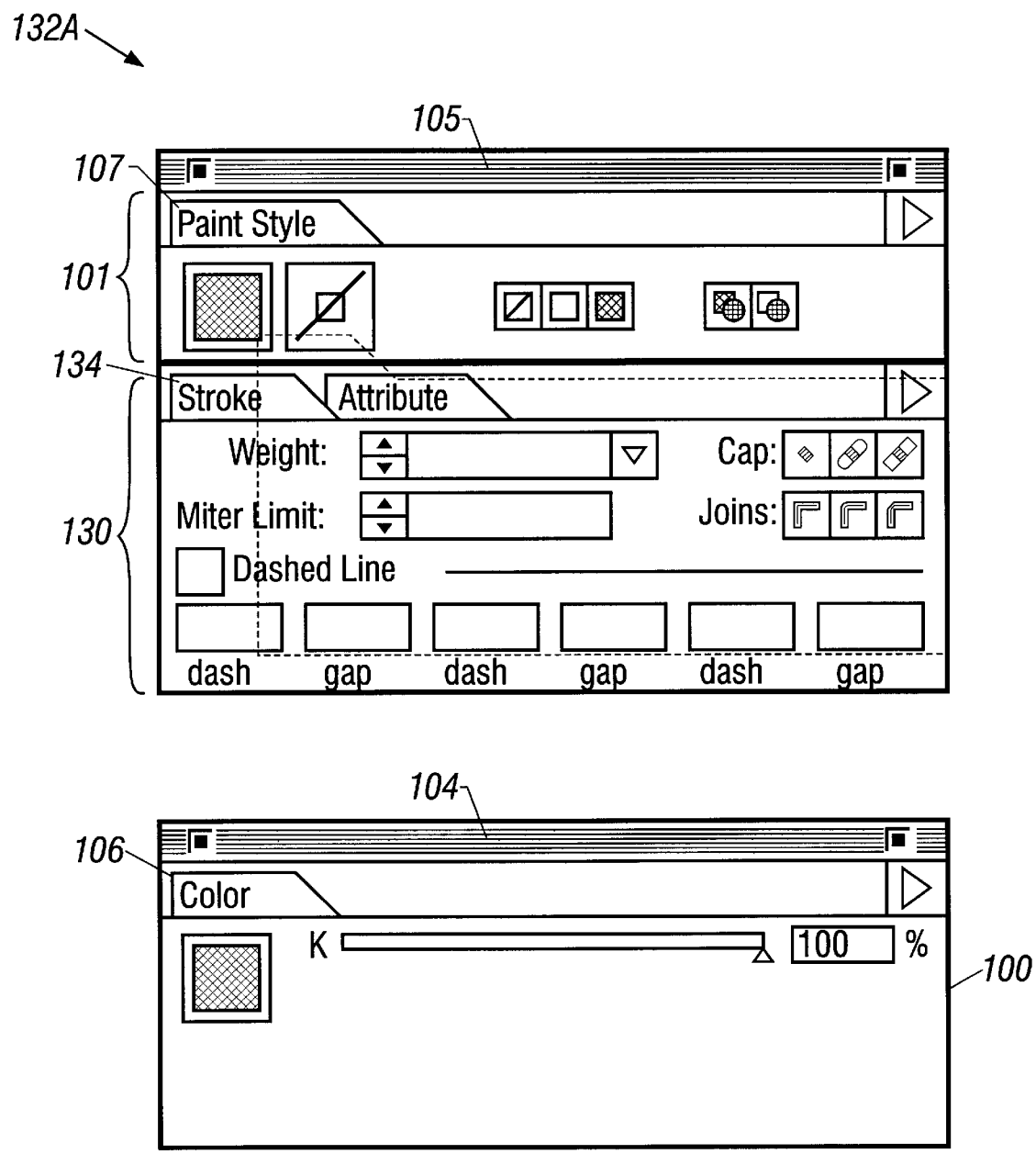

Referring to FIGS. 3A and 3B, once a group of palettes have been docked to each other, they can be "undocked" by the user. Undocking a palette appears as if a portion of the content of the combined or composite palette is detached and moved to a new palette. In FIG. 3A, three palettes 101, 100, and 130 (the "Paint Style," "Color," and "Stroke" palettes) are docked in the combined palette 132. To remove or undock a docked palette from the combined palette 132, the user selects the control tab of the palette to be removed and drags the palette away from the combined palette 132. Thus, for example, if the user wishes to undock the "Color" palette 100 from the combined palette 132, the user first selects the "Color" control tab 106 with the cursor, then drags the cursor away from the area of the combined palette 132, and next releases the mouse button once the cursor has been positioned outside the combined palette region.

As shown in FIG. 3B, the undocked "Color" palette 100 again appears as a full palette with the title bar 104. The modified combined palette 132A includes only the "Paint Style" and "Stroke" palettes. The "Stroke" palette 130 automatically is repositioned to attach to the bottom of the "Paint Style" palette 101 once the "Color" palette 100 is undocked.

Figure 4:
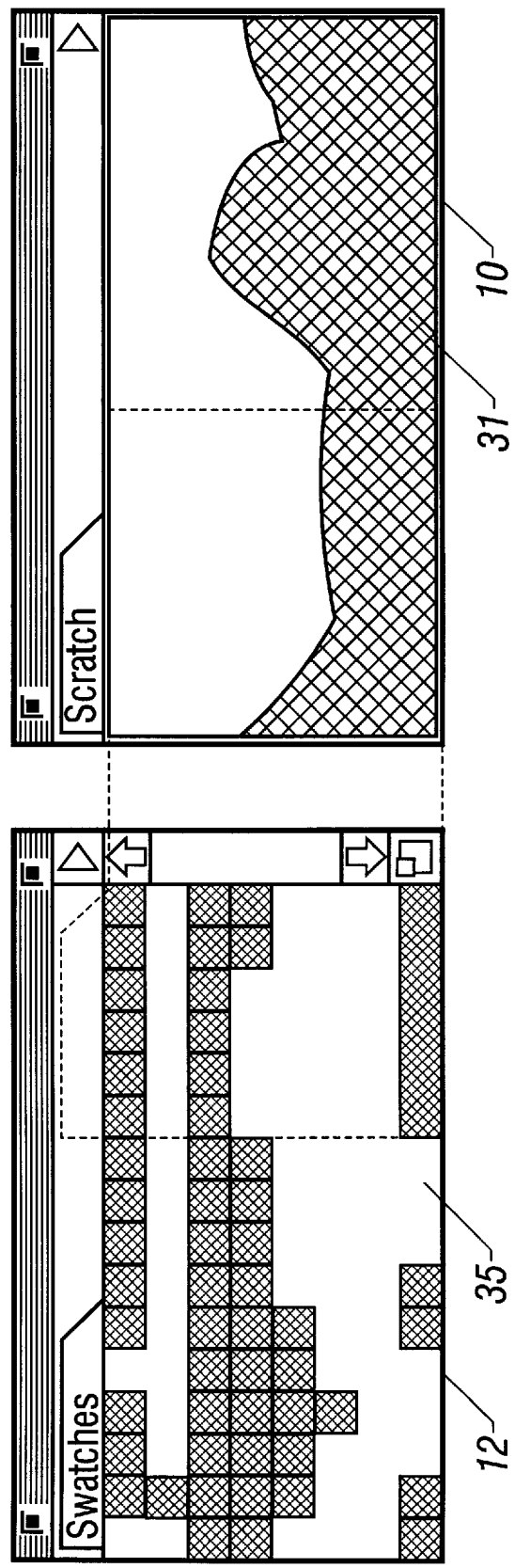
FIGS. 4, 5, and 6 illustrate the combining of palettes in a stacked or tabbed fashion.
Figure 5:
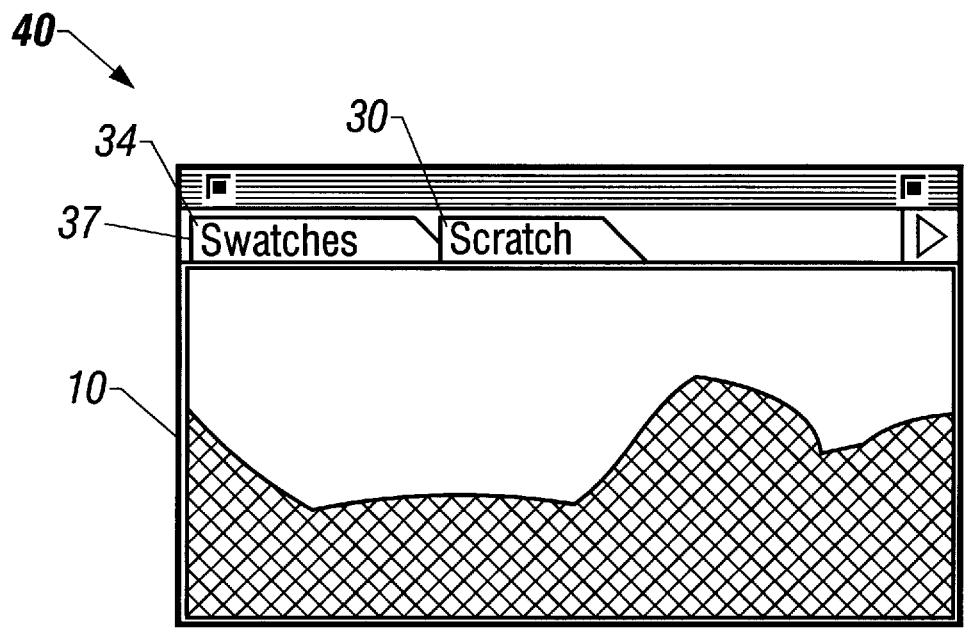
Figure 6:
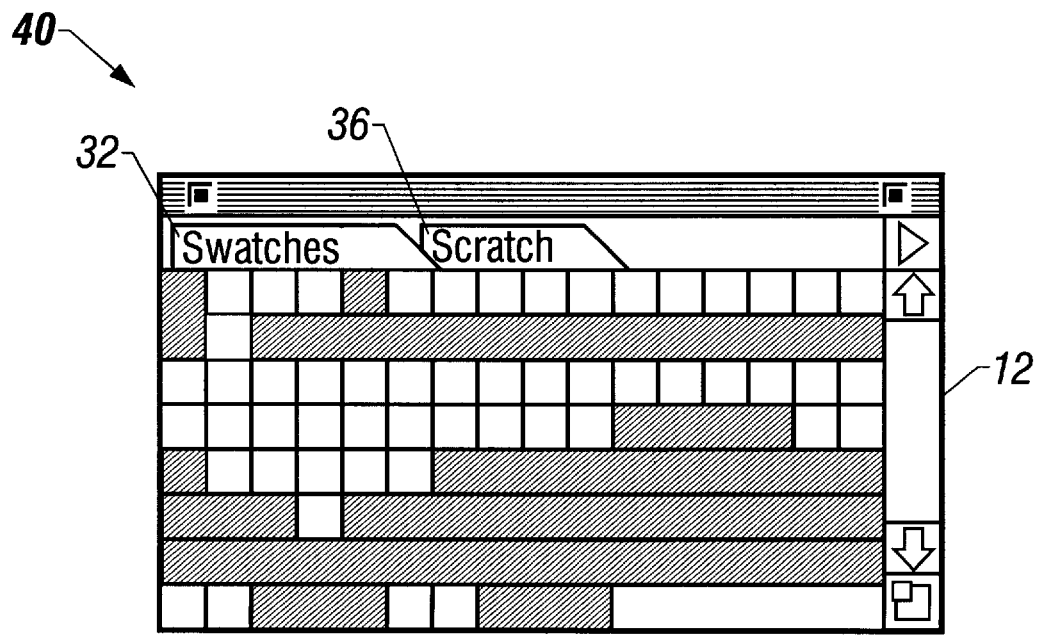

Referring to FIGS. 4, 5, and 6, the palettes can also be combined in a "stacked" or "tabbed" fashion. In FIG. 4, two separate palettes, the "Scratch" palette 10 (which contains control area 31) and the "Swatches" palette 12 (which contains control area 35), are shown. To stack the "Scratch" palette 10 to the "Swatches" palette 12, the "Scratch" palette 10 is selected and dragged to the left so that the cursor overlaps the control tab 34 of the "Swatches" palette 12. Once the user releases the mouse button when the cursor is over the control tab 34, the palettes 10 and 12 are stacked in a combined palette 40, as shown in FIG. 5. The control tabs 30 and 34 form a tab group in the control tab area 37 of the combined palette 40.

In their stacked state, the "Scratch" and "Swatches" palettes 10 and 12 move as one and occupy the same physical screen space as a combined palette 40. The combined palette 40 in FIG. 5 shows the "Scratch" palette 10 selected and visible, and the "Swatches" palette 12 being hidden behind it with only its control tab 34 visible. The combined palette 40 in FIG. 6 shows the "Scratch" palette 10 hidden with only its control tab 36 visible and the "Swatches" palette 12 is selected and fully visible.

When stacked, the palette control tabs of each of the two unified palettes assume one of two states: active, as shown by "Scratch" tab 30 in FIG. 5 and "Swatches" tab 32 in FIG. 6; or inactive, as shown by "Swatches" tab 34 in FIG. 5 and "Scratch" tab 36 in FIG. 6. Only the active palette is displayed, not the inactive one. Clicking on an inactive palette control tab, which always remains displayed, makes that palette the active one, and makes the formerly active palette inactive. By clicking on tab 34 in screen area 40 in FIG. 5, for example, the inactive "Swatches" palette 12 will replace the active and visible "Scratch" palette 10 as the palette in view, as shown in screen area 40 in FIG. 6. Thus, in the stacked state, the tab controls of both palettes always remain accessible, but the control area of the inactive palette, remains inaccessible to the user until the user selects the control tab of the hidden palette.

Any number of palettes can be stacked, one behind the other, by this technique. The only requirement is that the tabs of the hidden palettes always be visible so an inactive palette can be identified and retrieved. Stacked palettes may easily be separated or "unstacked" by the same technique as used for stacking them, as illustrated in FIG. 4. Clicking on the title control tab 34 in FIG. 5 of the inactive "Swatches" palette and dragging it outside of the combined screen area 40 will unstack the hidden "Swatches" palette 12 and place "Swatches" palette 12 in an area of the screen where it can be viewed.

Furthermore, palettes can be combined by a program using both the docking and stacking mechanisms. Referring again to FIG. 2A, the combined palette 131 includes the "Paint Style" palette 101 docked to a group 140 of stacked palettes consisting of the "Stroke" palette 130 and an "Attribute" palette which is hidden behind the "Stroke" palette 130 with only its "Attribute" control tab 158 visible.

Both the "Stroke" control tab 134 and the "Attribute" control tab 158 are displayed in the control tab area of the stacked group 140. As discussed above, the user can select which of the "Stroke" palette 130 or the "Attribute" palette is active in the stacked group 140 by clicking one of the control tabs 134 and 158.

With the ability to combine palettes using both the docking and stacking techniques, the user has greater flexibility to manage how the screen space of a computer display is utilized. The user can thus choose to dock the most often used palettes and to stack other, less often used palettes with palettes in the docked group.

Figure 7A:
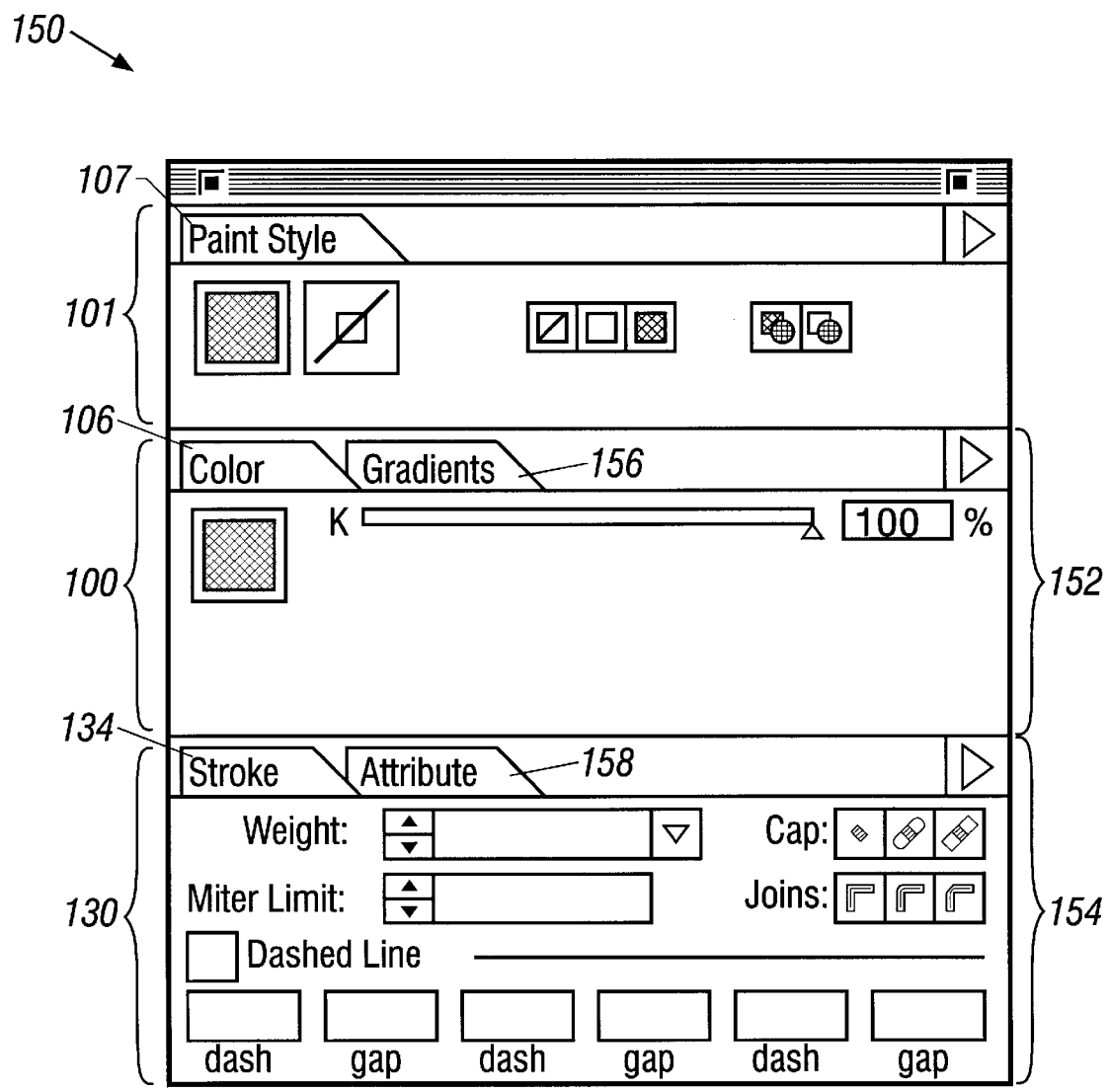
FIGS. 7A and 7B illustrate the undocking of a stacked group from a combined palette.
Figure 7B:
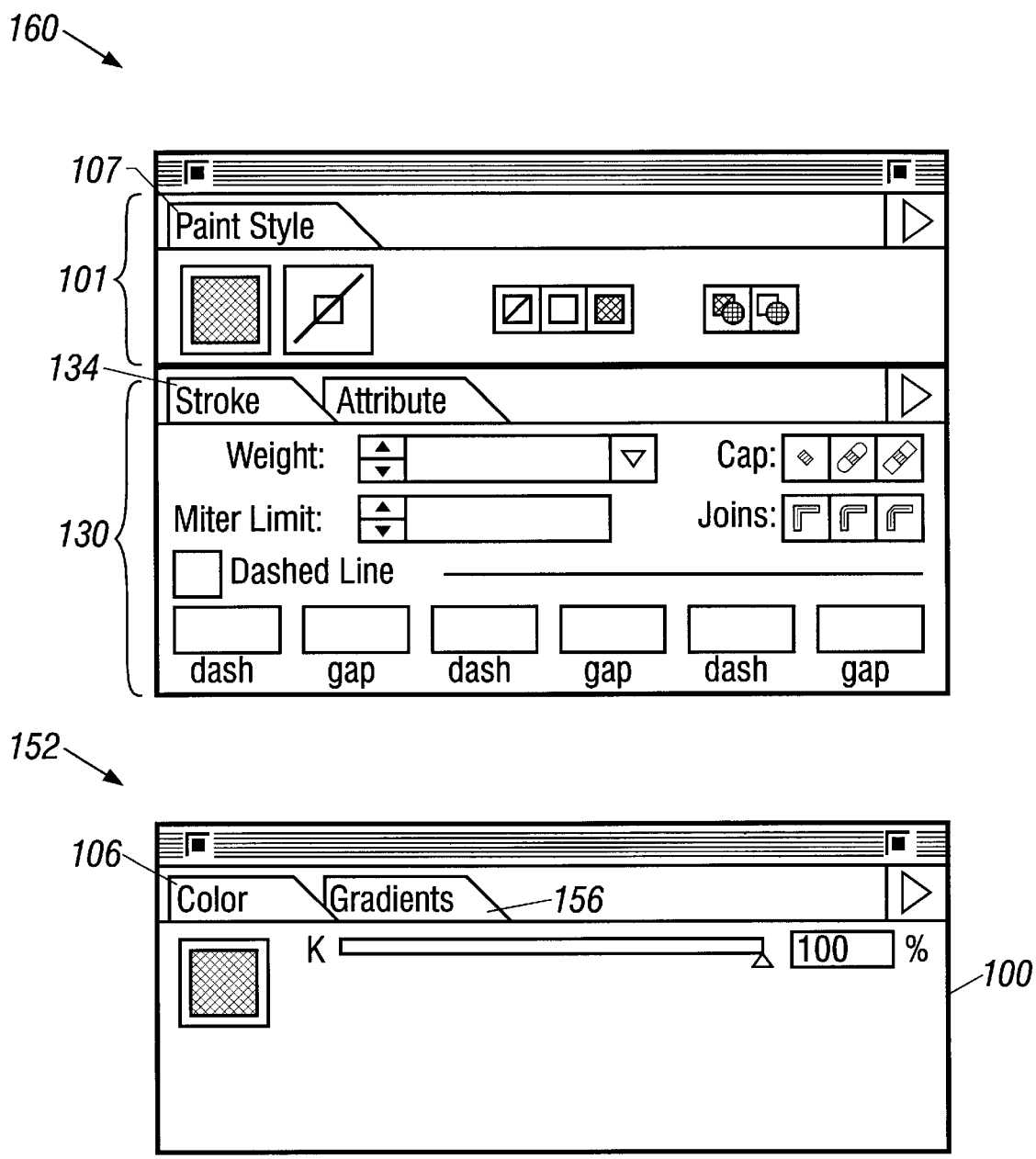

Referring to FIGS. 7A and 7B, a stacked group of palettes can be undocked from a combined palette. In FIG. 7A, the combined palette 150 includes the "Paint Style" palette docked to a first stacked group 152 of palettes and a second stacked group 154 of palettes. The first stacked group 152 consists of the "Color" palette 100 (which is active) and a Gradients palette (which is inactive). The second stacked group 154 consists of the "Stroke" palette (which is active) and the "Attribute" palette (which is inactive).

To undock the stacked group 152, the user selects the "Color" or Gradients control tab 106 or 156 while holding down a modifier key (e.g., a "Ctrl" key) and dragging the selected stacked group outside the area of the combined palette 150. As shown in FIG. 7B, once the operation is completed, two separate combined palettes are displayed: a combined palette 160 containing the "Paint Style," "Stroke," and "Attribute" palettes; and a combined palette 152 containing the stacked "Color" and Gradients palettes.

Figure 8A:
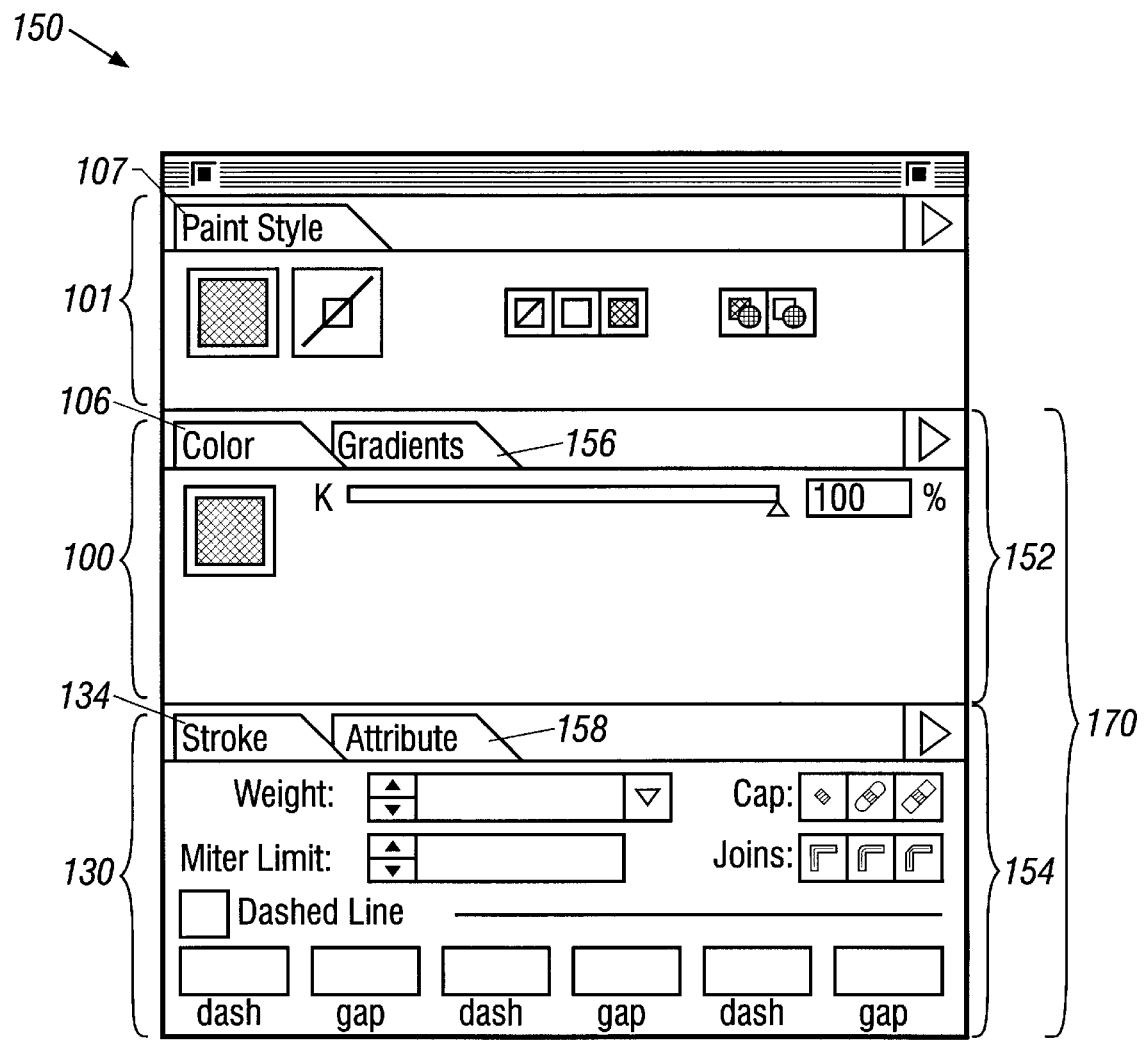
FIGS. 8A and 8B illustrate the undocking of a docked group from a combined palette.
Figure 8B:
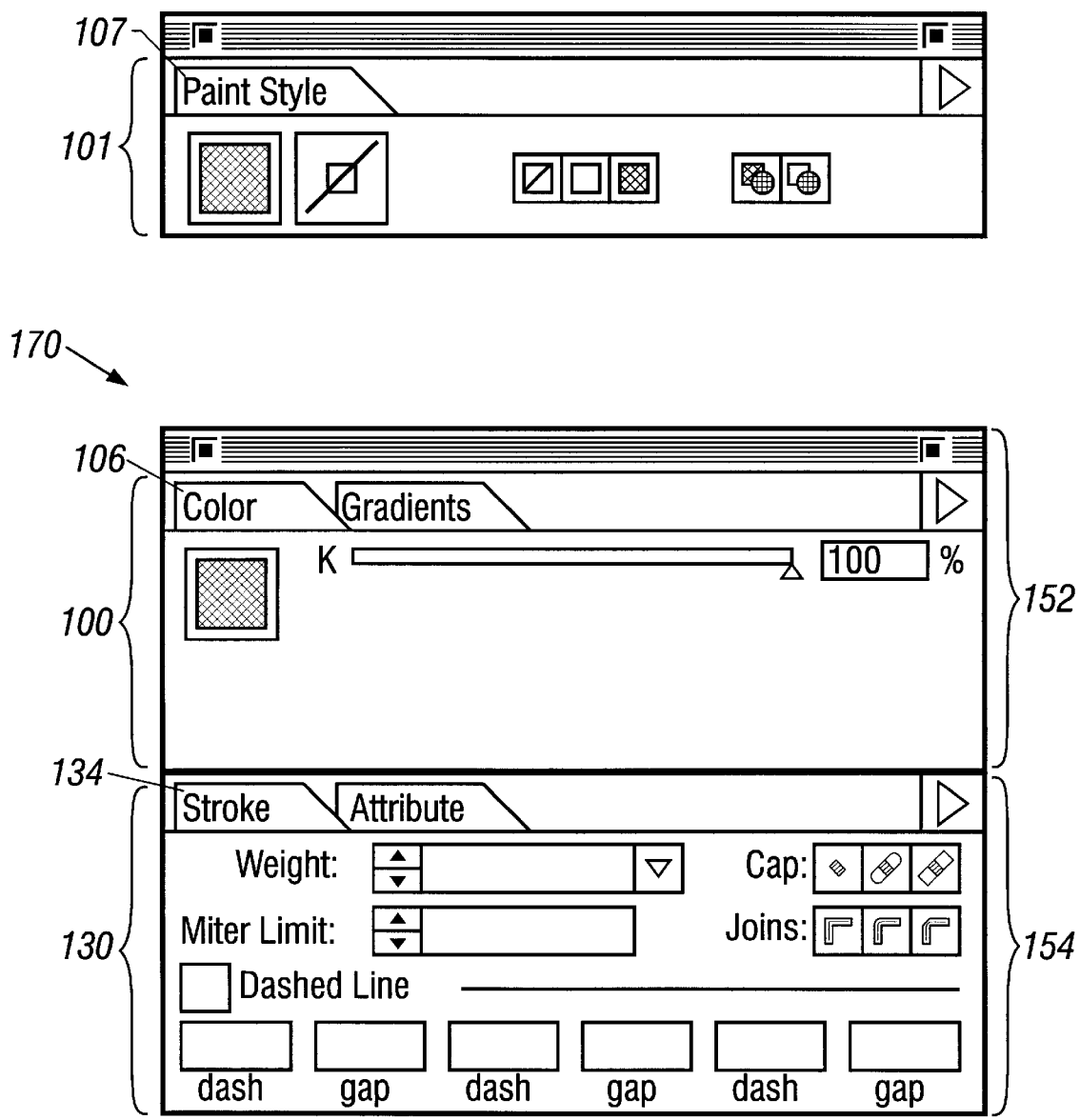

Referring to FIGS. 8A and 8B, a sub-group of docked palettes can also be undocked from a combined palette. To remove a group 170 of docked palettes from the combined palette 150, the user selects the "Color" control tab 106 using the cursor while pressing another modifier key (e.g., an "Alt" key). When the user drags the group 170 of palettes from the area of the combined palette 150 and releases the mouse button, the "Paint Style" palette 101 separates from the group 170 of palettes, as shown in FIG. 8B.

Figure 9A:
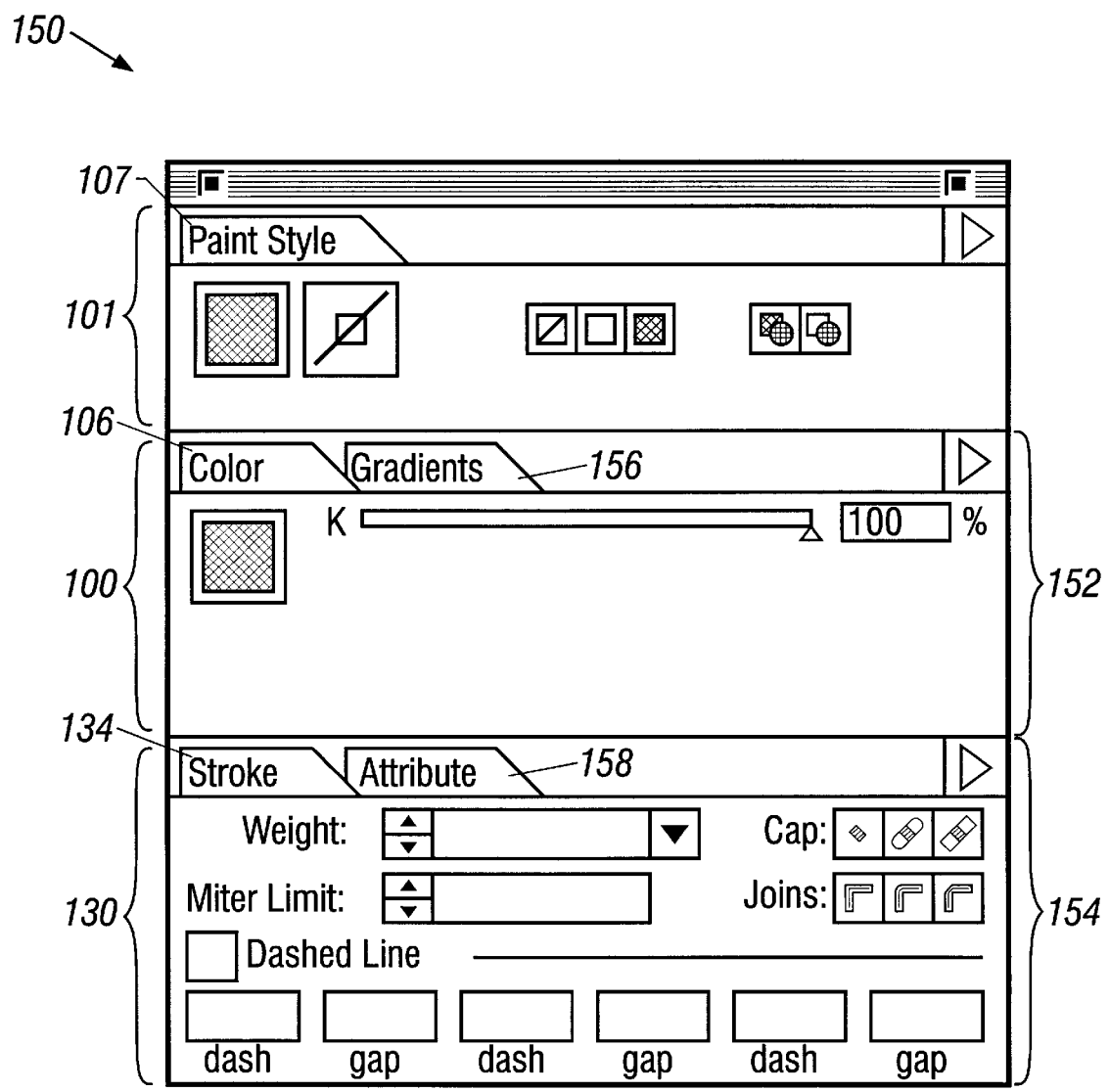
FIGS. 9A and 9B illustrate the collapsing of a stacked group of palettes in a combined group of docked palettes.
Figure 9B:
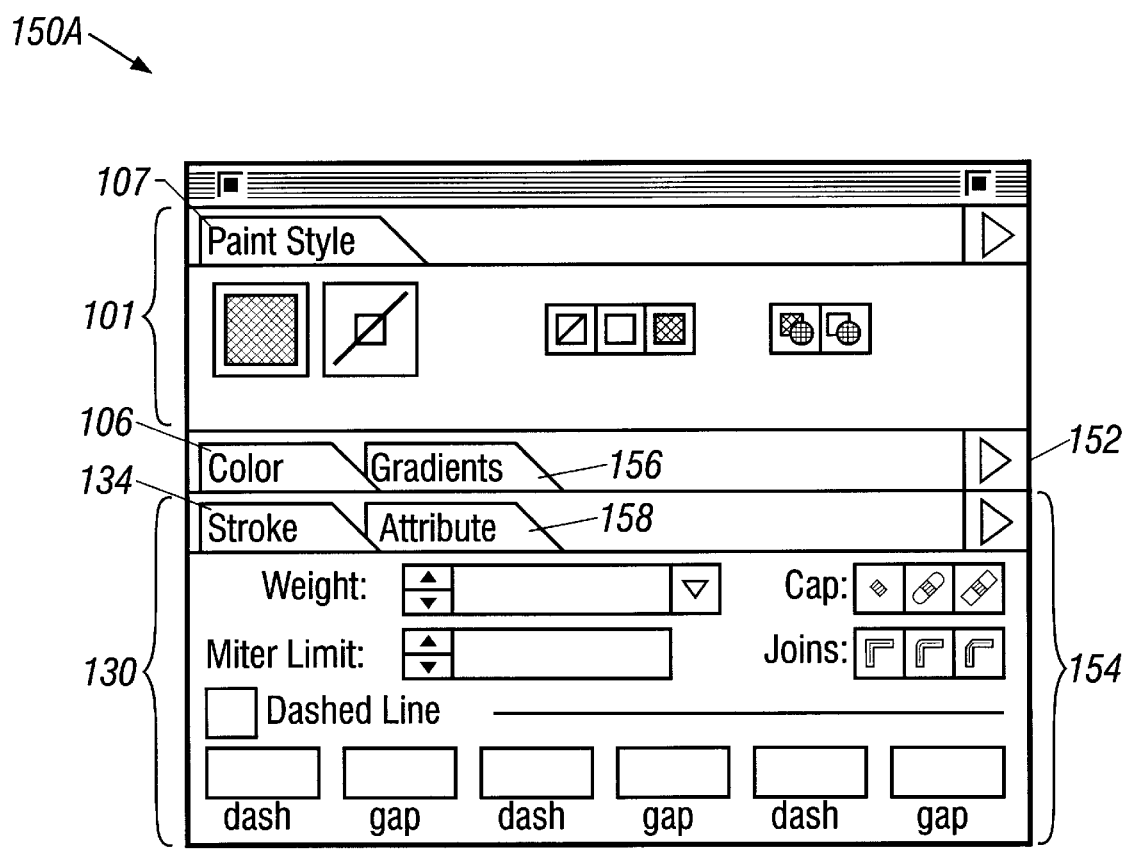

Referring to FIGS. 9A and 9B, a stacked group of palettes can also be "collapsed" so that only the control tabs of the stacked group are shown. For example, the combined palette 150 contains a stacked group 152 of palettes consisting of the "Color" palette 100 and the Gradients palette hidden behind the "Color" palette. By double clicking the "Color" control tab 106, the stacked group of palettes can be collapsed such that only the "Color" and Gradients control tabs in the stacked group 152 are displayed in the combined palette 150A, as shown in FIG. 9B. The docking order of the palettes in the combined palette 150A remains unchanged.

Figure 10A:
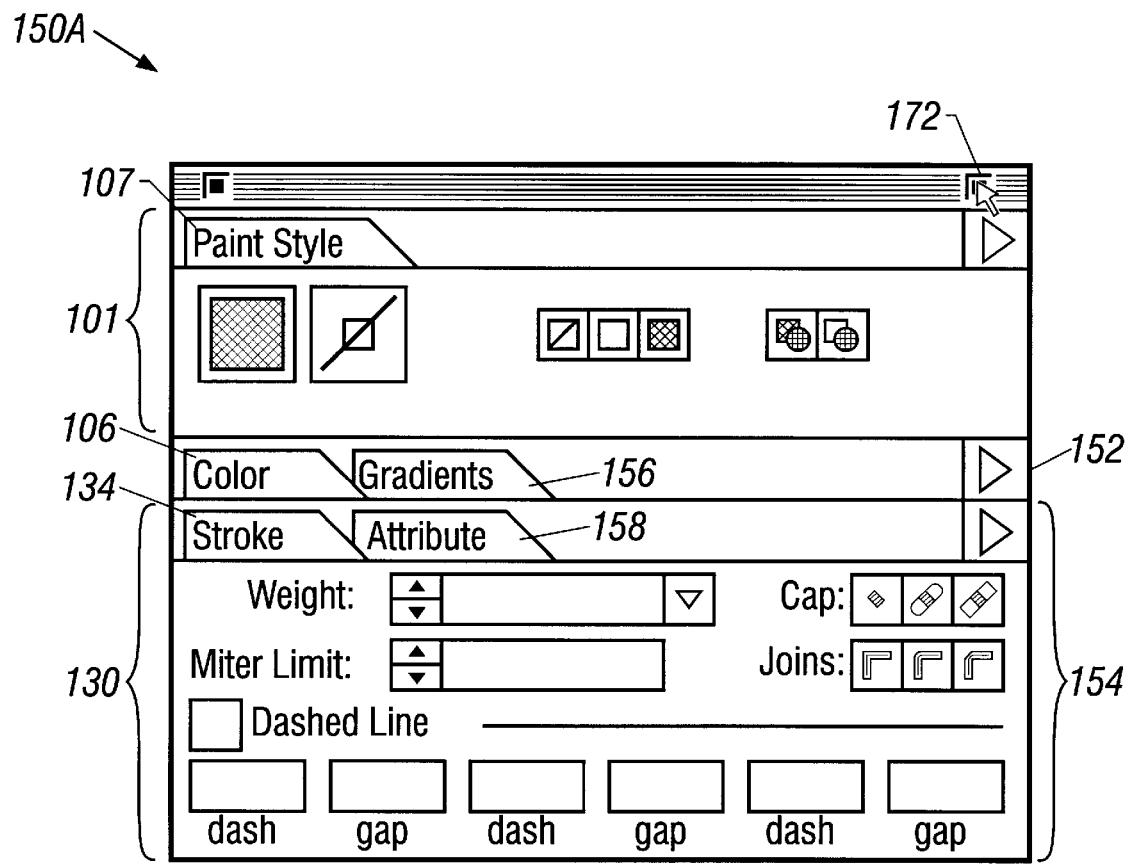
FIGS. 10A and 10B illustrate the expansion of a collapsed stacked group of palettes in a combined palette.
Figure 10B:
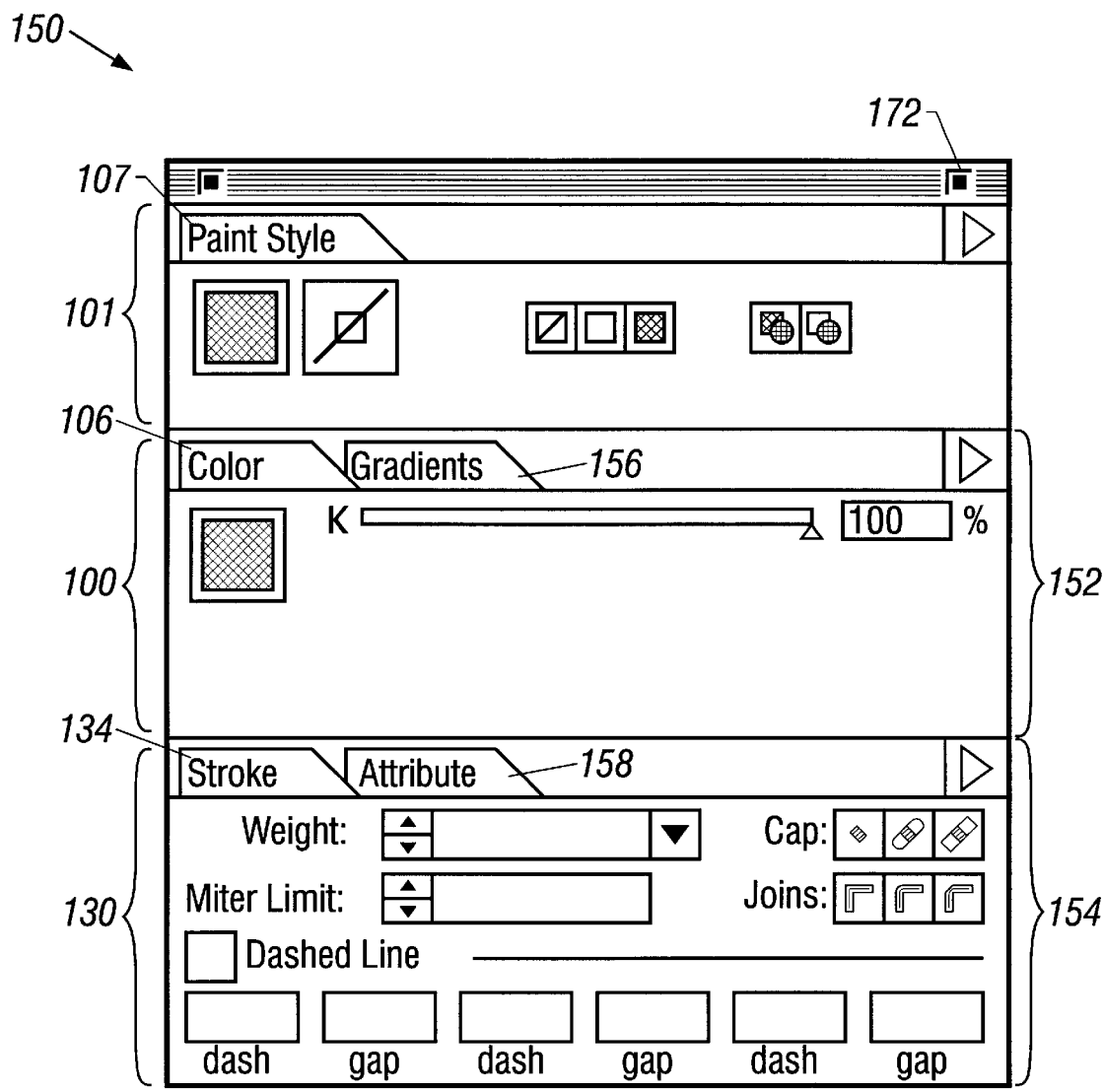

Referring to FIGS. 10A and 10B, the collapsed stacked group 150A can be expanded (or uncollapsed) by clicking the "Zoom" control button 172 of the combined palette 150A. Once clicked, the stacked group 152 expands again to show the active "Color" palette 100 in the stacked group 152.

Figure 11A:
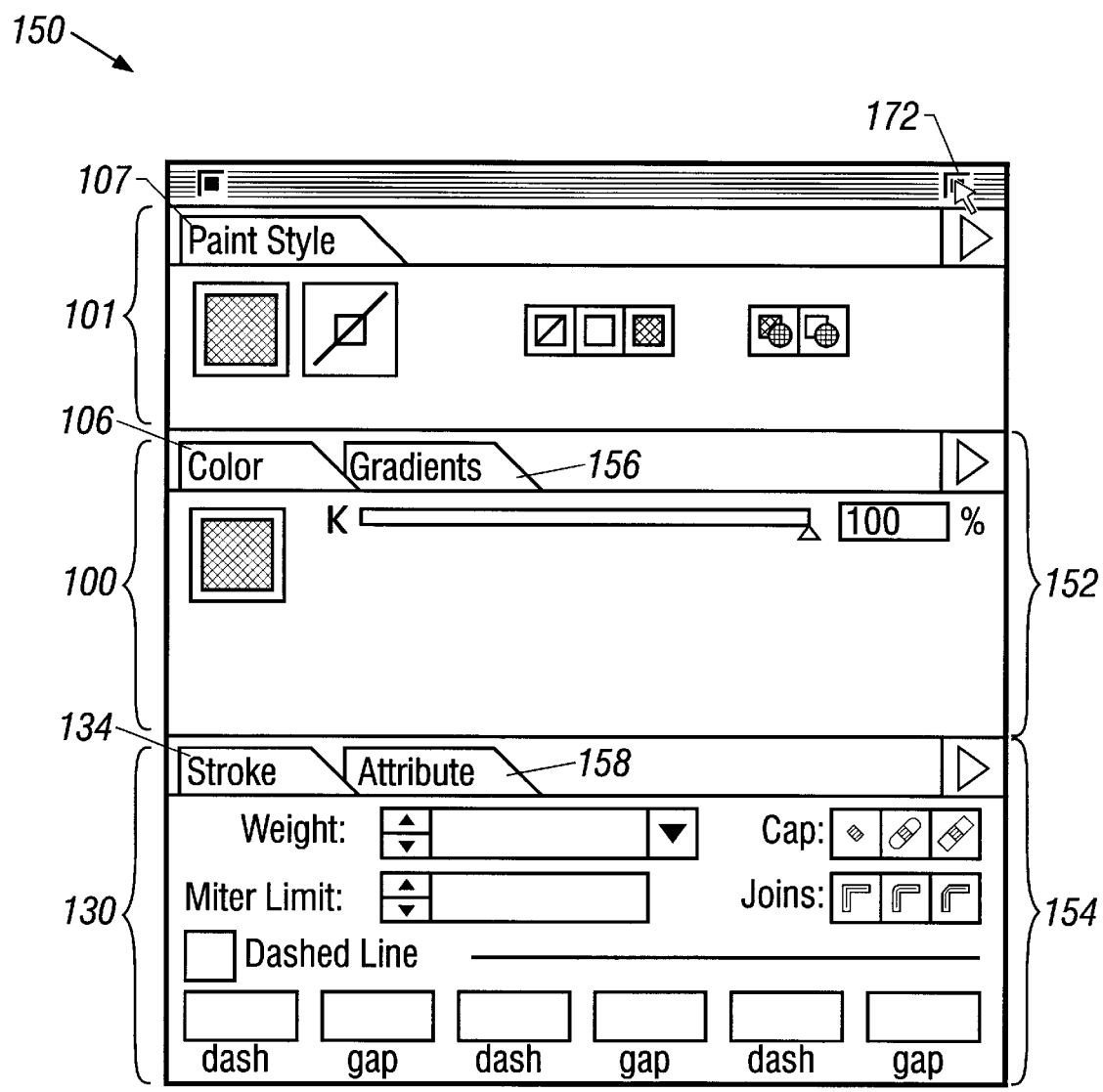
FIGS. 11A and 11B illustrate the collapsing of all palettes in a combined palette.
Figure 11B:
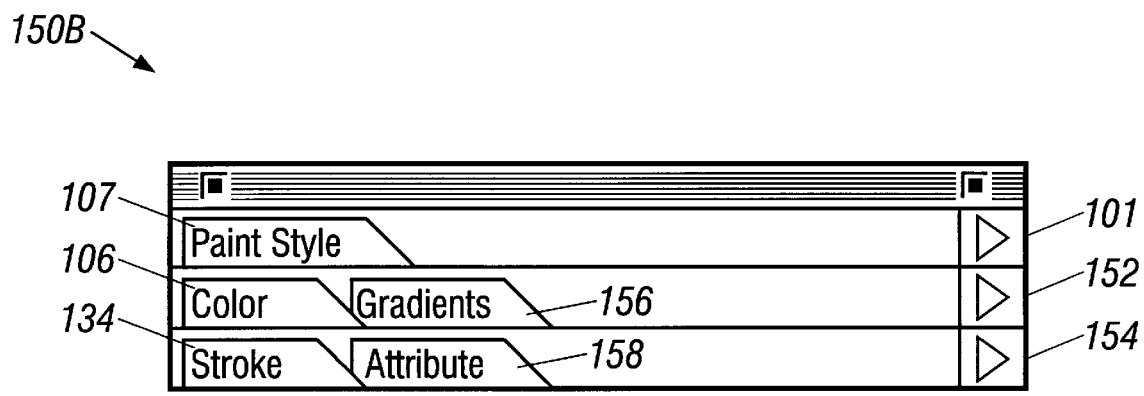

Referring to FIGS. 11A and 11B, by clicking the "Zoom" control button 172 of the combined palette 150 when none of the stacked palettes in the combined palette 150 are collapsed, the user causes all the palettes in the combined palette 150 to be collapsed. In the totally collapsed state, only the control tabs of the palettes of the combined palette 150B are shown.

Figure 12A:
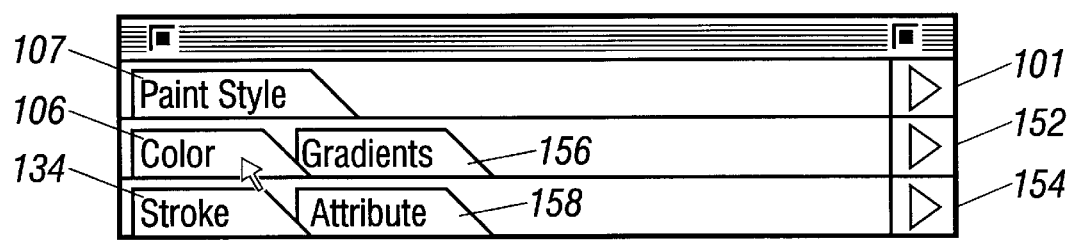
FIGS. 12A and 12B illustrate the expansion of a stacked group of palettes in a totally collapsed combined palette.
Figure 12B:
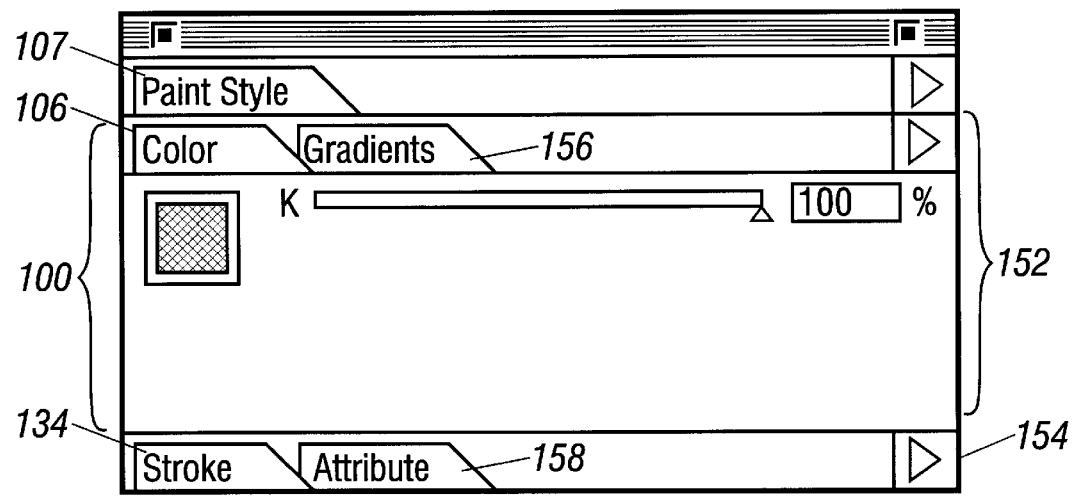
Figure 13A:
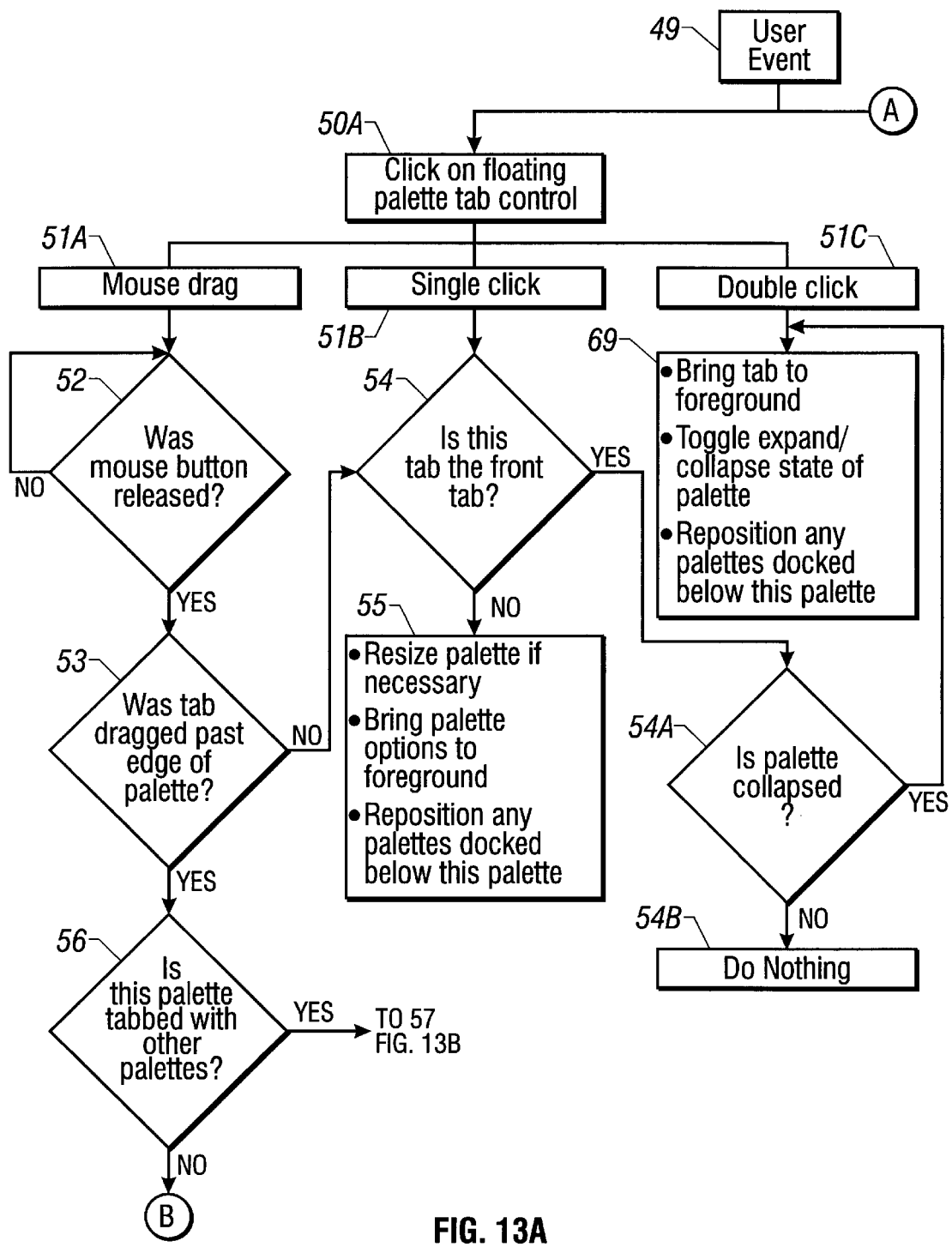
FIGS. 13A–13C is a flow diagram of a method for combining and docking palettes.
Figure 13B:
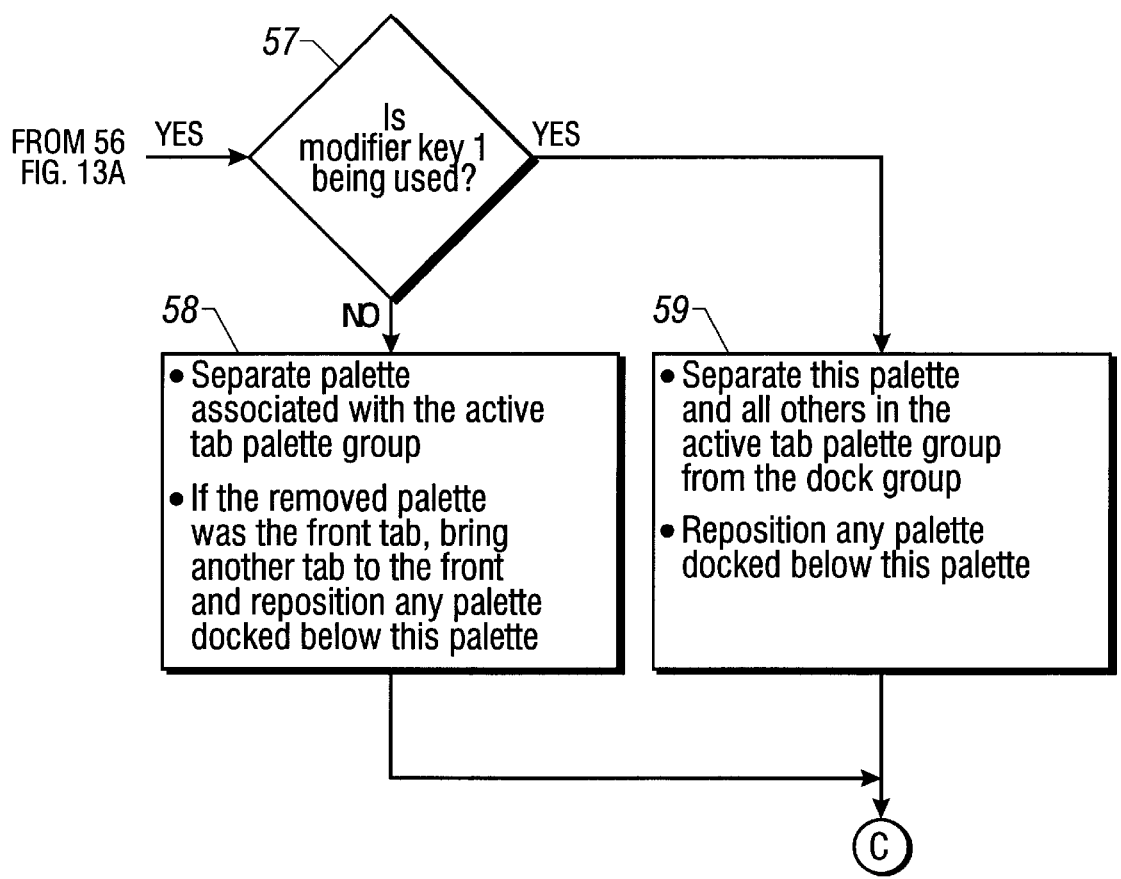
Figure 13C:
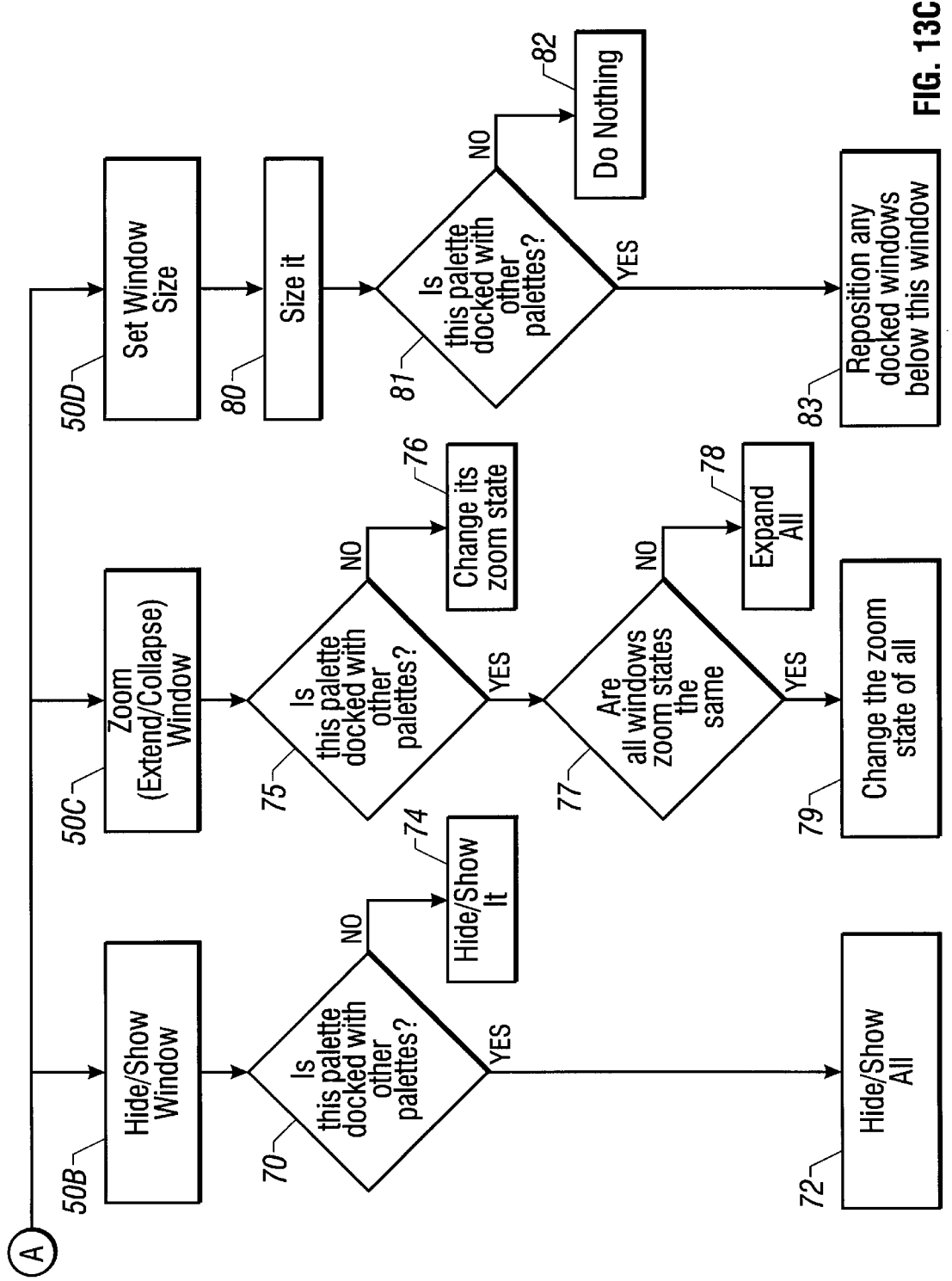
Figure 13D:
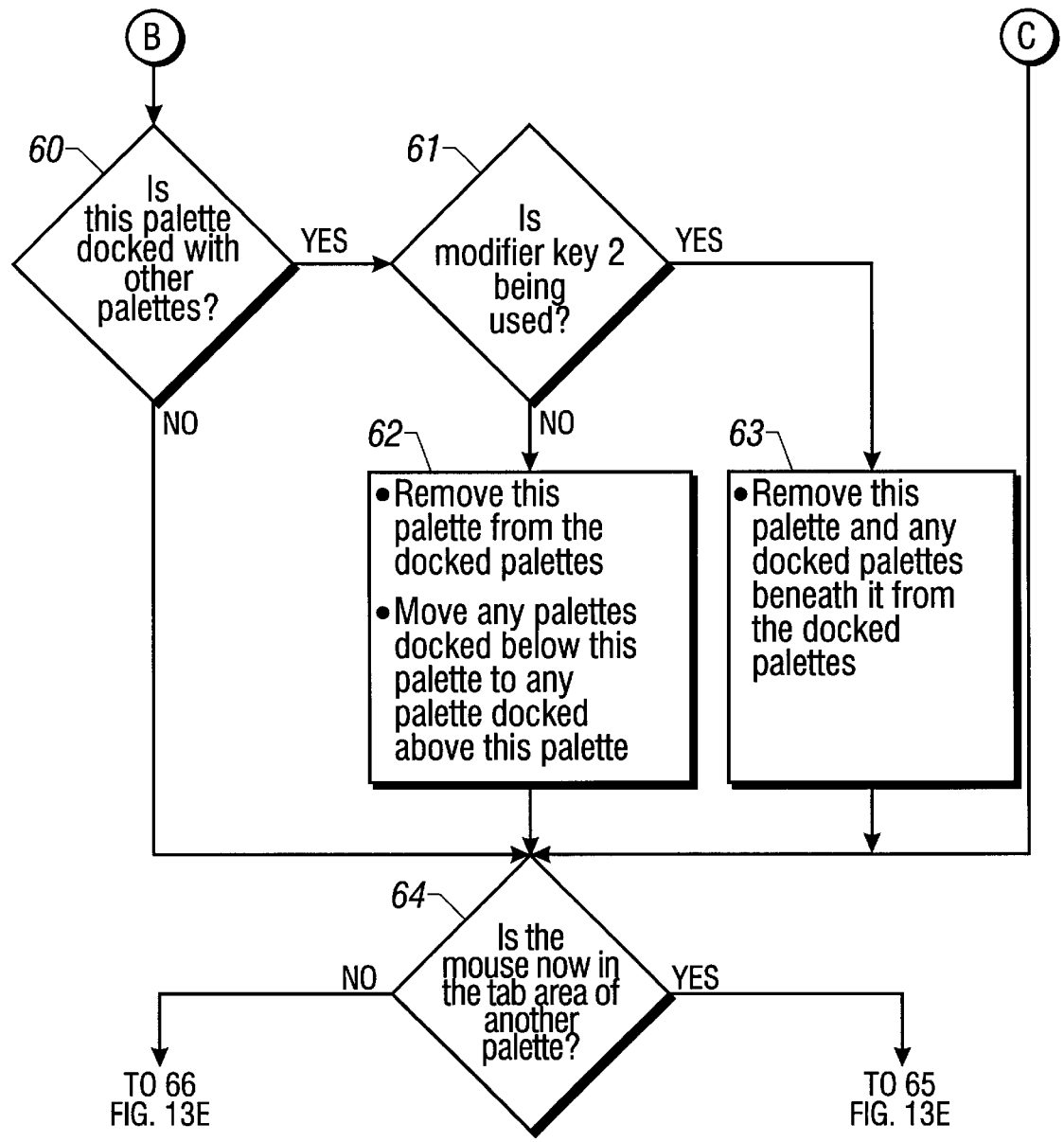
Figure 13E:
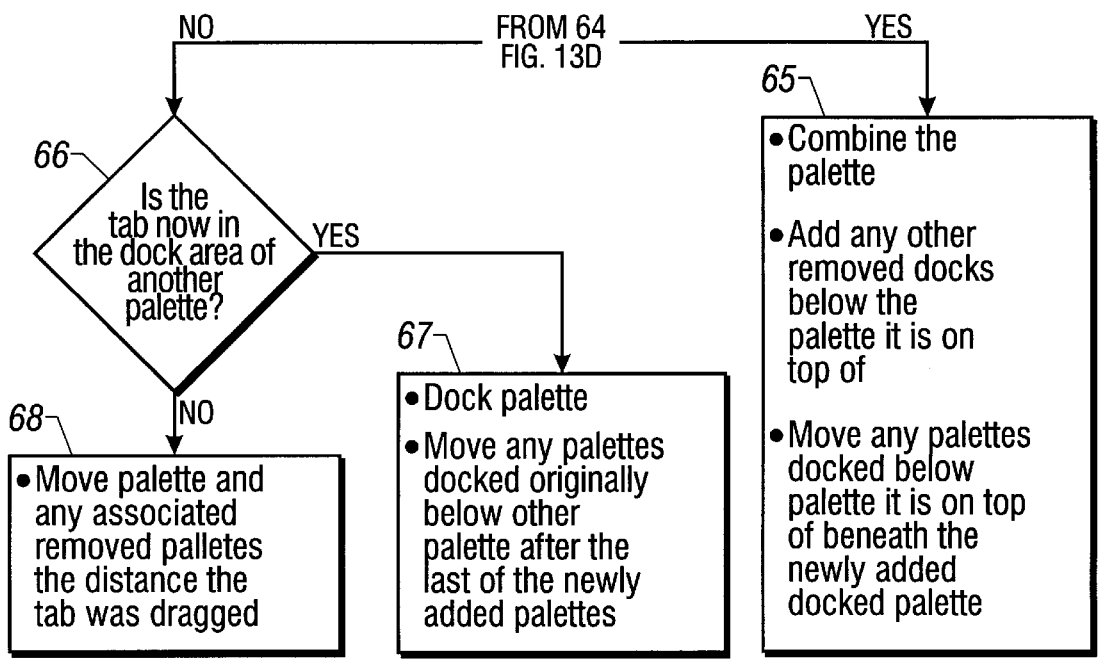

A collapsed combined palette is expanded by clicking the control tab of the palette to be expanded. In FIGS. 12A and 12B, a click on the "Color" control tab 106 expands the stacked group 152 of the "Color" and Gradients palettes in the combined palette 150C. If, however, the "Zoom" control button 172 is clicked instead, then all the palettes of the combined palette 150B are expanded.

Referring to FIGS. 13A–13E, the flow of a programmed method for docking, stacking, collapsing, and resizing palettes is shown. The program receives a user event at step 49 and proceeds down one of four separate paths depending on the received event. The received events include clicking a palette control tab, clicking a "Close" control button, clicking a "Zoom" control button, or a resizing command.

If the program detects at step 50A that the palette control tab has been clicked, then one of three sub-paths is chosen based on whether the mouse is dragged (51A), the mouse is single clicked (51B), or the mouse is double clicked (51C).

If the mouse is dragged, the program determines at step 52 if the mouse button has been released. If true, a second determination is made at step 53 as to whether the control tab has been dragged past the edge (that is, outside the area) of the combined palette.

If not, then the drag operation is merely equivalent to a single click function, and the software program proceeds as if it has received a single click command (step 51B). The software program determines at step 54 whether the selected palette control tab is the front tab in a group of stacked palettes. The tab is "in front of" other tabs when it belongs to an active palette which is stacked with an inactive palette. If the tab is determined to be not in front of another tab, the selected palette is made active (that is, the control tab and control area of the palette are made visible) at step 55, and the other tab is made inactive. In step 55, any necessary vertical resizing is performed by the user and the palettes docked below the selected palette are repositioned. If, however, the selected tab is determined at step 54 to be in front of another tab (that is, it is already active), then the program determines at step 54A if the tab belongs to a collapsed palette. If the palette is not collapsed, then nothing is done at step 54B. However, if the palette is collapsed, then the single-click operation is treated as equivalent to a double-click operation and the program next proceeds to step 69, described below.

Going back to the drag operation, if it is determined at step 53 that the selected control tab has been dragged past the edge of the combined palette, then a remove operation has been requested. The software program thus determines at step 56 if the selected palette is stacked or tabbed with other palettes in a stacked group. If so, at step 57, a determination is made whether a first modifier key (e.g., the "Ctrl" key) was pressed in the drag operation. If the first modifier key was not pressed, then only the selected palette out of the stacked group is undocked at step 58, leaving the other palette or palettes in the stacked group unmoved. In step 58, the moved palette is highlighted. Moreover, if the selected palette was an active palette in the stacked group, then another palette in the stacked group in the combined palette is made active and the palettes docked below are repositioned if necessary.

If the first modifier key is detected as being pressed at step 57, then the entire stacked group is separated or undocked at step 59. Further, in step 59, after separation, the selected palette is highlighted and brought to the foreground (that is, the palette is made active) if originally inactive, and the remaining palettes of the combined palette are repositioned.

If the selected palette is determined in step 56 not to be stacked with other palettes, then the program determines at step 60 if the palette is docked with other palettes. If so, the program next determines at step 61 if a second modifier key (e.g., the "Alt" key) is pressed while the selected control tab is being dragged. If the second modifier key is not pressed, then only the selected palette is undocked at step 62. Further, in step 62, the other palettes, if any, underneath the undocked palette are repositioned to dock to the palette above them in the combined palette. If the second modifier key is detected as being pressed at step 61, then the selected palette along with the palettes, if any, underneath the selected palette are undocked at step 63.

From step 60 (if the selected palette is not docked with other palettes), or from step 62, 63, 58, or 59, the program next determines at step 64 if the selected tab has been dragged to overlay part of the control tab of another palette (the "overlaid palette"). If so, the selected palette, or group of palettes (if stacked group or docked group is moved), are stacked with the overlaid palette at step 65. Thus, if a stacked group is to be stacked to the overlaid palette, then the control tab of the overlaid palette is displayed with the control tabs of the other palettes in the original stacked group, with only the overlaid palette active in the newly stacked group. If a docked group is to be stacked to the overlaid palette, then the selected palette is stacked with the overlaid palette and the other docked palettes underneath are positioned under the overlaid palette.

If it is determined at step 64 that the selected control tab does not overlay the control tab of another palette, the program next determines at step 66 if the selected control tab is in the dock area of a another palette (the "docking palette"). If so, the selected palette or palettes are docked to the bottom of the docking palette at step 67. All palettes originally underneath the docking palette before the docking operation are repositioned to dock to the selected palette or last of the selected group of palettes. If the selected control tab is not detected to be in the dock area of another tab at step 66, then no docking operation is needed and the palette or palettes are moved the distance that the tab was dragged at step 68.

If, at step 51C, the received event is a double-click of a control tab, then the selected control tab is brought to the foreground at step 69. In addition, at step 69, the palette associated with the control tab is expanded or collapsed depending on its original state. Once the palette has been expanded or collapsed, all palettes docked below the expanded or collapsed palette are repositioned.

As discussed above, a palette can be hidden from view by clicking its "Close" control button ("hide command"). Once hidden, the palette can be reactivated by choosing an appropriate menu command which designates the hidden palette ("show command"). If the received event is detected at step 50B as being either the hide or show command, then it is determined at step 70 whether the selected palette is docked with other palettes. If not, then the palette is hidden or activated at step 74. If the selected palette is docked with other palettes in a combined palette, then the entire combined palette is hidden or activated at step 72.

A combined palette can also be collapsed or expanded as desired. If the received event is detected at step 50C as being the clicking of the "Zoom" control button of a palette, then the program determines at step 75 if the palette is docked with other palettes. If not, then the "Zoom" state of the palette is toggled from the collapsed state to the expanded state or vice versa.

If, however, the palette is docked with other palettes in a combined palette, then the program determines at step 77 if all the palettes in the combined palette have the same "Zoom" state. If not, then all the palettes in the combined palette are expanded at step 78. If all the palettes have the same "Zoom" state, however, the "Zoom" state of all the palettes are toggled (from collapsed to expanded state or vice versa).

A palette can also be resized vertically by dragging the "Resize" control button of a palette (the "resize command"). If the received event is detected as being the resize command at step 50D, then the palette is resized vertically at step 80. Next, the program determines at step 81 if the resized palette is docked with other palettes. If not, then nothing further is done at step 82. However, if the palette is docked with other palettes, then all palettes docked below the resized palette are repositioned.

Figure 14:
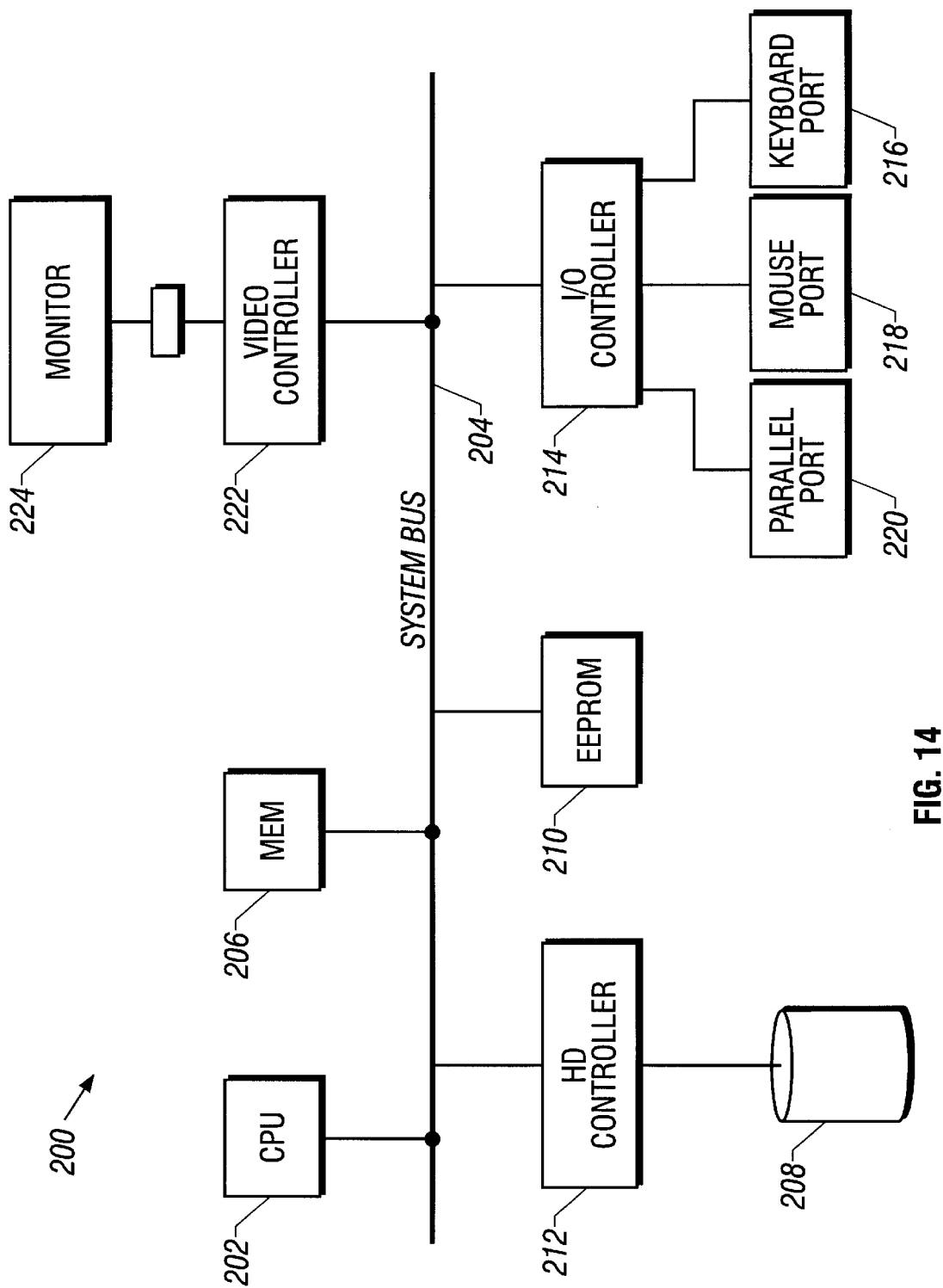
FIG. 14 is a block diagram of a computer system suitable for practicing the present invention.
Figure 15:
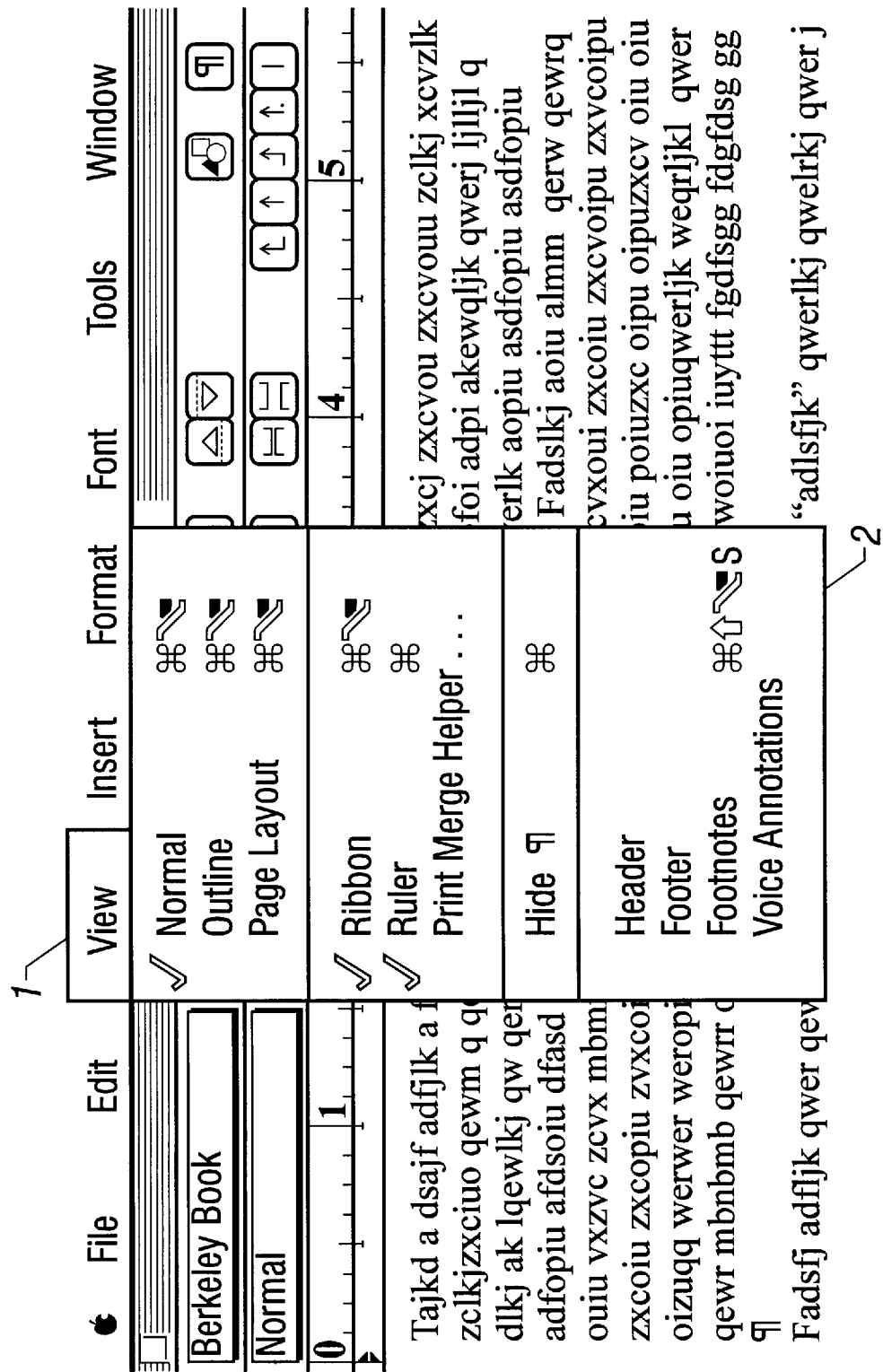
FIG. 15 illustrates the use of pull-down menus in a computer program.
Figure 16:
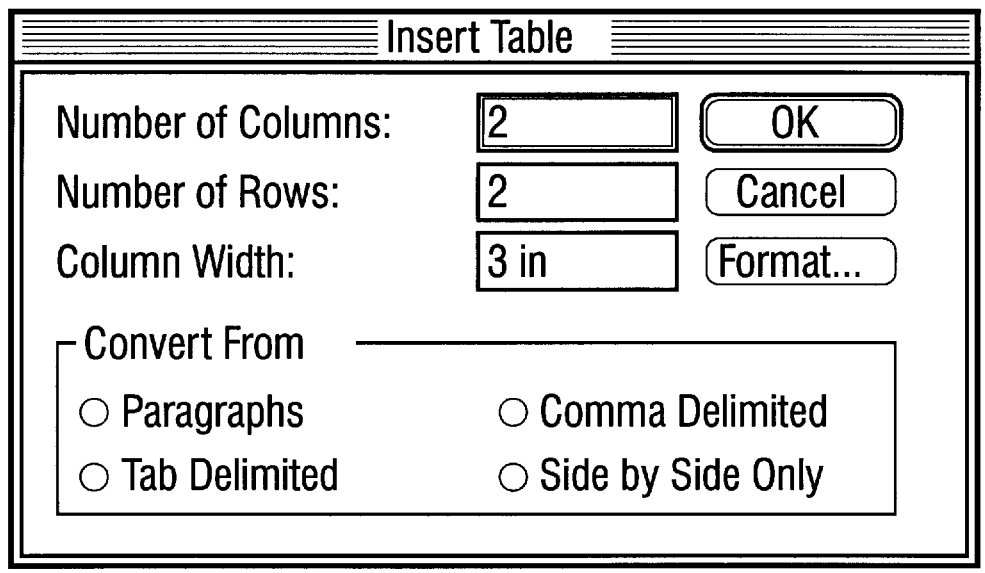
FIG. 16 illustrates a typical dialog box in a computer program.
Figure 17:
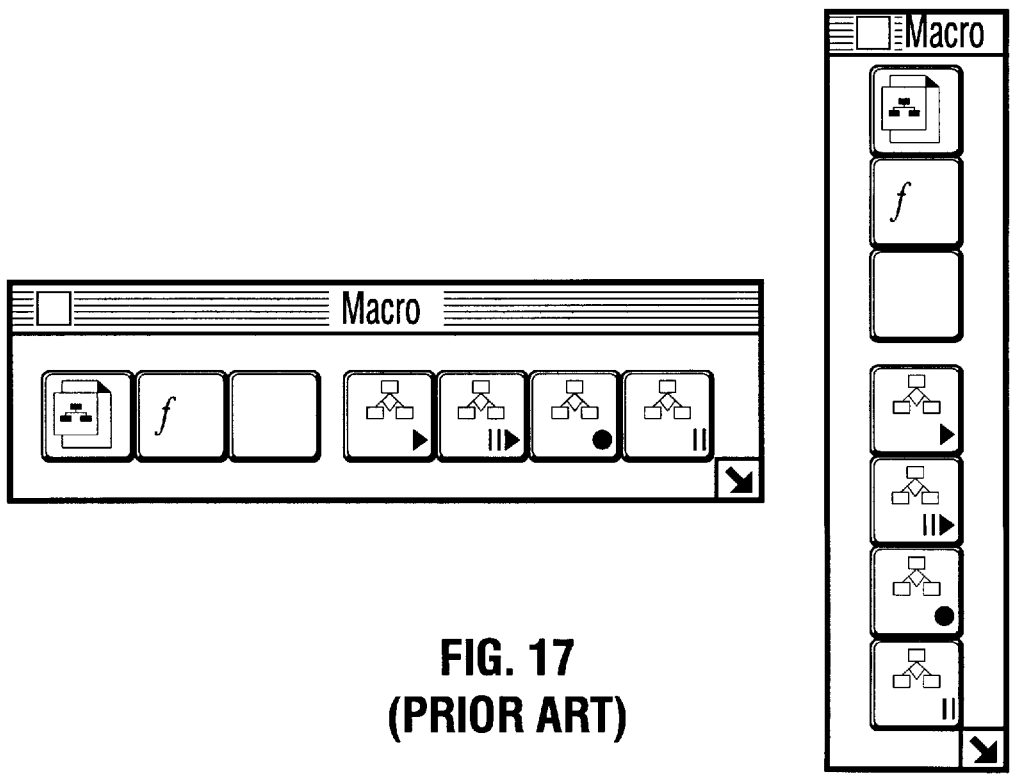
FIG. 17 illustrates the use of floating palettes in a computer program.

Referring to FIG. 14, a program according to the invention may be implemented in digital electronic circuitry or in computer hardware, firmware, software, or in combinations of them, such as in a computer system 200. The computer system 200 includes a central processing unit (CPU) 202 such as a personal computer microprocessor connected to a internal system bus 204. The storage media in the computer system 200 include a main memory 206 (which can be implemented with dynamic random access memory devices), a hard disk drive 208 for mass storage, and an electrically erasable programmable read only memory (EEPROM) 210. The main memory 206 and EEPROM 210 are connected to the bus 204, and the hard disk drive 208 is coupled to the bus 204 through a hard disk drive controller 212.

Apparatus of the invention may be implemented in a computer program product tangibly embodied in a machine-readable storage device (such as the hard disk drive 208, main memory 206, or EEPROM 210) for execution by the CPU 202. Suitable processors include, by way of example, both general and special purpose microprocessors. Generally, a processor will receive instructions and data from the read-only memory 210 and/or the main memory 206. Storage devices suitable for tangibly embodying computer program instructions include all forms of non-volatile memory, including by way of example semiconductor memory devices, such as EPROM, EEPROM, and flash memory devices; magnetic disks, such as the internal hard disk drive 208 and removable disks; magneto-optical disks; and CD-ROM disks. Any of the foregoing may be supplemented by, or incorporated in, specially-designed ASICs (application-specific integrated circuits).

The computer system 200 further includes an input/output (I/O) controller 214 connected to the bus 204 and which provides a keyboard interface 216 (for connection to an external keyboard), a mouse interface 218 (for connection to an external mouse or other pointer device), and a parallel port interface 220 (for connection to a printer). In addition, the bus 204 is connected to a video controller 222 which couples to a computer monitor 224. Data associated with an image for display on the computer monitor 224 (such as the palettes) are provided over the system bus 204 by application programs to the video controller 222.

Other embodiments are within the scope of the following claims. For example, the order of the steps of the invention may be changed by those skilled in the art and still achieve desirable results. In addition, the palettes can be docked to each other on their sides rather than in a top-to-bottom manner. Further, the palettes can be somewhat different from each other in width, and the smaller palette would expand from side to side to equal the width of the larger palette, or the larger one shrink to conform to the smaller, taking into account any size limitations imposed upon one or more palettes by the underlying program.

What is claimed is:

1. A computer-implemented graphical user interface method, comprising:

receiving a select command to select a first window from a group of three or more separate and distinct windows, each window having its own content and its own decoration and being an independent user interface object;

receiving a dock command to combine the selected first window and a distinct second window from the group of windows; and docking the first window to the second window in response to the dock command to form a single composite window having its own content and its own decoration, the content of the composite window including at least a substantial portion of the content of the first window and a substantial portion of the content of the second window.

2. The method of claim 1, wherein the content of the composite window includes all of the content of the first window and all of the content of the second window.

3. The method of claim 1, wherein the content of each of the first and second windows includes a selection indicator and a control area, the control area having user selectable options specific to the respective window.

4. The method of claim 1, further comprising:
receiving a detach command to detach the content of the first window from the composite window; and
displaying the first window content in a new first window and displaying the remaining content in the composite window, whereby two separate windows are displayed on a computer display.

5. The method of claim 1, further comprising:
receiving a select command to select a third window from the remaining windows in the group;
receiving a second dock command to combine the selected third window with the composite window; and
docking the third window with the composite window to add at least a substantial portion of the content of the third window to the content of the composite window.

6. The method of claim 5, further comprising:
receiving a detach command to detach the content of a selected one of the first, second, or third window from the composite window; and
displaying the content of the selected window in a new window and displaying the remaining content of the composite window in the composite window.

7. The method of claim 1, wherein the first window is a user interface tool palette and the second window is a user interface tool palette.

8. The method of claim 1, wherein the composite window includes a first pane containing the first window content and a second pane containing the second window content.

9. The method of claim 8, further comprising:
receiving a select command to select a third window from the remaining windows in the group;
receiving a stack command to stack the selected third window with either the first pane or the second pane of the composite window, wherein the contents of the two stacked windows form a stacked group of contents, and wherein each of the stacked window contents includes a selection indicator; and
displaying the selection indicator of each of the window contents comprising the stacked group of contents.

10. The method of claim 9, further comprising:
receiving a select command to activate one of the selection indicators; and
displaying the content of the window associated with the active selection indicator and hiding a substantial portion of the non-selection indicator content of the other window.

11. The method of claim 10, further comprising:
receiving a detach command to detach the content of the window associated with the active selection indicator from the composite window; and
displaying the content of the window associated with the active selection indicator in a new window and displaying the remaining content of the composite window in the composite window.

12. The method of claim 9, further comprising:
receiving a detach command to detach the stacked group of contents from the composite window; and
displaying the stacked group of contents in a new composite window and displaying the remaining content of the original composite window in the original composite window.

13. The method of claim 8, further comprising:
receiving a collapse command to collapse a selected one of the first and second panes in the composite window, wherein the content of each of the first and second windows includes a selection indicator; and
displaying the selection indicator and hiding the remaining content of the selected first or second pane.

14. The method of claim 13, further comprising:
receiving an uncollapse command to uncollapse the previously collapsed first or second pane in the composite window; and
displaying the selection indicator and displaying at least a substantial portion of the remaining content of the previously collapsed first or second pane.

15. The method of claim 8, further comprising:
receiving a collapse command to collapse each of the first and second panes in the composite window, wherein the content of each of the first and second windows includes a selection indicator; and
displaying the selection indicators and hiding the remaining contents of the first and second panes.

16. The method of claim 15, further comprising:
receiving an uncollapse command to uncollapse each of the previously collapsed first and second panes in the composite window; and
displaying the selection indicators and displaying at least a substantial portion of the remaining contents of the first and second panes.

17. A computer-implemented graphical user interface method, comprising:
receiving a command to detach the contents of a selected plurality of docked windows from a composite window; and
displaying the contents of the selected windows in a new composite window and displaying the remaining content of the original composite window in the original composite window.

18. A computer program residing on a computer-readable medium, comprising instructions for causing the computer system to:
receive a select command to select a first window from a group of three or more separate and distinct windows, each window having its own content and its own decoration and being an independent user interface object;
receive a dock command to combine the selected first window and a distinct second window from the group of windows; and
dock the first window to the second window in response to the dock command to form a single composite window having its own content and its own decoration, the content of the composite window including at least a substantial portion of the content of the first window and a substantial portion of the content of the second window.

19. The computer program of claim 18, wherein the content of each of the first and second windows includes a selection indicator and a control area, the control area having user selectable options specific to the respective window.

20. The computer program of claim 18, comprising instructions for causing the computer system further to:
receive a detach command to detach the content of the first window from the composite window; and
display the first window content in a new first window and display the remaining content in the composite window, whereby two separate windows are displayed on a computer display.

21. The computer program of claim 18, comprising instructions for causing the computer system further to:
receive a select command to select a third window from the remaining windows in the group;
receive a second dock command to combine the selected third window with the composite window; and
dock the third window with the composite window to add at least a substantial portion of the content of the third window to the content of the composite window.

22. The computer program of claim 21, comprising instructions for causing the computer system further to:
receive a detach command to detach the content of a selected one of the first, second, or third window from the composite window; and
display the content of the selected window in a new window and display the remaining content of the composite window in the composite window.

23. The computer program of claim 18, wherein the first window is a user interface tool palette and the second window is a user interface tool palette.

24. The computer program of claim 18, wherein the composite window includes a first pane containing the first window content and a second pane containing the second window content.

25. The computer program of claim 24, comprising instructions for causing the computer system further to:
receive a select command to select a third window from the remaining windows in the group;
receive a stack command to stack the selected third window with either the first pane or the second pane of the composite window, wherein the contents of the two stacked windows form a stacked group of contents, and wherein each of the stacked window contents includes a selection indicator; and
display the selection indicator of each of the window contents comprising the stacked group of contents.

26. The computer program of claim 25, comprising instructions for causing the computer system further to:
receive a select command to activate one of the selection indicators; and
display the content of the window associated with the active selection indicator and hide a substantial portion of the non-selection indicator content of the other window.

27. The computer program of claim 26, comprising instructions for causing the computer system further to:
receive a detach command to detach the content of the window associated with the active selection indicator from the composite window; and
display the content of the window associated with the active selection indicator in a new window and display the remaining content of the composite window in the composite window.

28. The computer program of claim 25, comprising instructions for causing the computer system further to:
receive a detach command to detach the stacked group of contents from the composite window; and
display the stacked group of contents in a new composite window and display the remaining content of the original composite window in the original composite window.

29. The computer program of claim 24, comprising instructions for causing the computer system further to:
receive a collapse command to collapse a selected one of the first and second panes in the composite window, wherein the content of each of the first and second windows includes a selection indicator; and
display the selection indicator and hide the remaining content of the selected first or second pane.

30. The computer program of claim 29, comprising instructions for causing the computer system further to:
receive an uncollapse command to uncollapse the previously collapsed first or second pane in the composite window; and
display the selection indicator and display at least a substantial portion of the remaining content of the previously collapsed first or second pane.

31. The computer program of claim 24, comprising instructions for causing the computer system further to:
receive a collapse command to collapse each of the first and second panes in the composite window, wherein the content of each of the first and second windows includes a selection indicator; and
display the selection indicators and hide the remaining contents of the first and second panes.

32. The computer program of claim 31, comprising instructions for causing the computer system further to:
receive an uncollapse command to uncollapse each of the previously collapsed first and second panes in the composite window; and
display the selection indicators and display at least a substantial portion of the remaining contents of the first or second panes.

33. A computer program residing on a computer-readable medium comprising instructions for causing the computer system to:
receive a command to detach the contents of a selected plurality of docked windows from a composite window; and
display the contents of the selected windows in a new composite window and display the remaining content of the original composite window in the original composite window.

* * * * *

UNITED STATES PATENT AND TRADEMARK OFFICE
CERTIFICATE OF CORRECTION

PATENT NO. : 5,870,091

DATED : 2/9/99

INVENTOR(S) : Lazarony, Jr. et al.

It is certified that error appears in the above-identified patent and that said Letters Patent is hereby corrected as shown below:

```
Column 4, line 3, replace "13C" with --13E--.
Column 5, line 32, delete "133".
```

Signed and Sealed this

Thirteenth Day of July, 1999

Attest:

Q. TODD DICKINSON

*Attesting Officer*     *Acting Commissioner of Patents and Trademarks*